United States Patent
Huang et al.

(10) Patent No.: US 10,437,525 B2
(45) Date of Patent: Oct. 8, 2019

(54) COMMUNICATION EFFICIENT SECRET SHARING

(71) Applicants: California Institute of Technology, Pasadena, CA (US); The Research Foundation for the State University of New York, Amherst, NY (US); New Jersey Institute of Technology, Newark, NJ (US)

(72) Inventors: Wentao Huang, Pasadena, CA (US); Michael Langberg, Buffalo, NY (US); Joerg Kliewer, Fair Lawn, NJ (US); Jehoshua Bruck, La Canada, CA (US)

(73) Assignees: California Institute of Technology, Pasadena, CA (US); The Research Foundation For the State University of New York, Amherst, NY (US); New Jersey Institute of Technology, Newark, NJ (US)

( * ) Notice: Subject to any disclaimer, the term of this patent is extended or adjusted under 35 U.S.C. 154(b) by 372 days.

(21) Appl. No.: 15/167,967

(22) Filed: May 27, 2016

(65) Prior Publication Data
US 2017/0017581 A1     Jan. 19, 2017

Related U.S. Application Data

(60) Provisional application No. 62/167,104, filed on May 27, 2015.

(51) Int. Cl.
*G06F 3/06*     (2006.01)
*G06F 21/00*     (2013.01)
(Continued)

(52) U.S. Cl.
CPC ............ *G06F 3/0689* (2013.01); *G06F 3/065* (2013.01); *G06F 3/067* (2013.01); *G06F 3/0623* (2013.01);
(Continued)

(58) Field of Classification Search
CPC ..... G06F 21/10; G06F 21/6218; H04L 9/0894
(Continued)

(56) References Cited

U.S. PATENT DOCUMENTS 8,291,224 B2 * 10/2012 Pelton ..................... H04L 63/06
                                                                     713/175
8,542,823 B1 * 9/2013 Nguyen .............. G06F 21/6218
                                                                    380/42
(Continued)

OTHER PUBLICATIONS

Beimel, "Secret-sharing schemes: a survey", Proceeding IWCC'11 Proceedings of the Third international conference on Coding and Cryptology, May 30-Jun. 3, 2011, Qingdao, China, pp. 11-46.
(Continued)

*Primary Examiner* — Lynn D Feild
*Assistant Examiner* — Viral S Lakhia
(74) *Attorney, Agent, or Firm* — KPPB LLP

(57) ABSTRACT

Methods for distributed storage in accordance with embodiments of the invention enable secret sharing. One embodiment includes encoding source data using an encoding system to produce a plurality of sets of encoded data, where: the source data can be recovered from at least a portion of less than all of the plurality of sets of encoded data; and the source data cannot be recovered using less than a threshold number of the plurality of sets of encoded data; storing each of the plurality of sets of encoded data on a storage device from a set of storage devices on which encoded data is stored; determining a set of storage devices that are available using a decoding system, where the set of storage devices that are available does not include all of the storage devices in the set of storage devices on which encoded data is stored.

27 Claims, 6 Drawing Sheets

(51) Int. Cl.
*G06F 21/62* (2013.01)
*H04L 29/06* (2006.01)

(52) U.S. Cl.
CPC ............ *G06F 3/0643* (2013.01); *G06F 21/00* (2013.01); *G06F 21/6209* (2013.01); *H04L 63/04* (2013.01); *H04L 63/0428* (2013.01); *G06F 2221/2107* (2013.01)

(58) Field of Classification Search
USPC .................................. 713/150–155; 726/2–7
See application file for complete search history.

(56) References Cited

U.S. PATENT DOCUMENTS

| | | | | |
|---|---|---|---|---|
| 8,843,637 | B2* | 9/2014 | Dietrich | H04L 63/104 709/226 |
| 9,722,637 | B2* | 8/2017 | Li | H03M 13/1515 |
| 9,906,360 | B2* | 2/2018 | Johnson | G06F 21/14 |
| 2007/0136525 | A1* | 6/2007 | Read | G06F 11/1076 711/114 |
| 2012/0179905 | A1* | 7/2012 | Ackerly | G06F 21/6218 713/155 |
| 2012/0243679 | A1* | 9/2012 | Obana | G06F 21/6209 380/28 |
| 2013/0198583 | A1* | 8/2013 | Shen | H03M 13/15 714/756 |
| 2013/0205181 | A1* | 8/2013 | Blaum | G06F 11/1076 714/763 |
| 2013/0238900 | A1* | 9/2013 | Leggette | H04L 63/0428 713/165 |
| 2014/0019774 | A1* | 1/2014 | Nakayama | G06F 21/79 713/189 |
| 2014/0201541 | A1* | 7/2014 | Paul | G06F 21/6245 713/193 |
| 2014/0359276 | A1* | 12/2014 | Resch | H04L 63/0457 713/153 |
| 2015/0043732 | A1* | 2/2015 | Resch | H04L 9/085 380/46 |
| 2015/0127946 | A1* | 5/2015 | Miller | G06F 21/6218 713/171 |
| 2015/0127974 | A1* | 5/2015 | Jiekak | G06F 11/1092 714/6.24 |
| 2015/0356305 | A1* | 12/2015 | Volvovski | G06F 11/1464 713/164 |
| 2016/0006463 | A1* | 1/2016 | Li | H03M 13/1515 714/766 |

OTHER PUBLICATIONS

Bitar et al., "Staircase codes for secret sharing with optimal communication and read overheads", arXiv:1512.02990 [cs.IT], Dec. 9, 2015, 13 pages.
Blakley, "Safeguarding cryptographic keys", Managing Requirements Knowledge, International Workshop on (1979), Jun. 4, 1979 to Jun. 7, 1979, pp. 313-317.
Blakley et al., "Security of ramp schemes", Advances in Cryptology, CRYPTO '84, LNCS 196, 1985, pp. 242-268.
Blaum et al., "EVENODD: an efficient scheme for tolerating double disk failures in RAID architectures", IEEE Transactions on Computers, vol. 44, Issue 2, Feb. 1995, pp. 192-202.
Blaum et al., "MDS array codes with independent parity symbols", IEEE Transactions on Information Theory, vol. 42, No. 2, Mar. 1996, pp. 529-542.
Capocelli et al., "On the size of shares for secret sharing schemes", Journal of Cryptology, vol. 6, Issue 3, Mar. 1993, pp. 157-167.
Dimakis et al., "A survey on network codes for distributed storage", Proceedings of the IEEE, vol. 99, No. 3, Mar. 2011, pp. 476-489.
Karnin et al., "On secret sharing systems", IEEE Transactions on Information Theory, vol. 29, No. 1, Jan. 1983, pp. 35-41.

Kurihara et al., "A new (k, n)-threshold secret sharing scheme and its extension", Information Security. ISC 2008. Lecture Notes in Computer Science, vol. 5222, Sep. 15, 2008, pp. 455-470.
Lai et al., "Several generalizations of Shamir's secret sharing scheme", International Journal of Foundations of Computer Science, vol. 15, No. 2, Apr. 2004, pp. 445-458.
McEliece et al., "On sharing secrets and Reed-Solomon codes", Communications of the ACM, vol. 24, No. 9, Sep. 1981, pp. 583-584.
Rashmi et al., "Optimal exact-regeneration codes for distributed storage at the MSR and MBR points via a product-matrix construction", IEEE Transactions on Information Theory, vol. 57, Issue 8, Aug. 2011, pp. 5227-5239.
Shamir, "How to share a secret", Communications of the ACM, vol. 22, No. 11, Nov. 1979, pp. 612-613.
Stinson, "An explication of secret sharing", Designs, Codes, and Cryptography, vol. 2, Issue 4, Dec. 1992, pp. 357-390.
Tamo et al., "Zigzag codes: MDS array codes with optimal rebuilding", IEEE Transactions on Information Theory, vol. 59, Issue 3, Mar. 2013, pp. 1597-1616.
Wang et al., "On secret reconstruction in secret sharing schemes", IEEE Transactions on Information Theory, vol. 54, No. 1, Jan. 2008, pp. 473-480.
Yamamoto, "Secret sharing system using (k, L, n) threshold scheme", Electronics and Communications in Japan (Part I: Communications), vol. 69, No. 9, Sep. 1986, pp. 46-54.
Yang et al., "A (t, n) multi-secret sharing scheme", Applied Mathematics and Computation, vol. 151, Issue 2, Apr. 5, 2004, pp. 483-490.
Zhang et al., "Threshold changeable secret sharing schemes revisited", Theoretical Computer Science, vol. 418, Feb. 10, 2012, pp. 106-115.
Alon, "Combinatorial Nullstellensatz", Journal of Combinatorics, Probability and Computing Archive, vol. 8, No. 1-2, Jan. 1999, 26 pgs.
Barwick et al., "Updating the Parameters of a Threshold Scheme by Minimal Broadcast", IEEE Transactions on Information Theory, vol. 51, No. 2, Feb. 2005, 15 pgs.
Beimel et al., "Secret Sharing with Public Reconstruction", IEEE Transactions on Information Theory, vol. 44, No. 5, Sep. 1998, 11 pgs.
Benaloh et al., "Generalized Secret Sharing and Monotone Functions", Proceedings of the 8th Annual International Cryptology Conference on Advances in Cryptology, Aug. 21-25, 1988, pp. 27-35.
Blundo et al., "Graph decompositions and secret sharing schemes", Journal of Cryptology, vol. 8, No. 1, Dec. 1995, 29 pgs.
Brickell, "Some Ideal Secret Sharing Schemes", Proceedings of the Workshop on the Theory and Application of Cryptographic Techniques on Advances in Cryptology—EUROCRYPT '89, Houthalen, Belgium, Apr. 10-13, 1989, pp. 468-475.
Cadambe et al., "Asymptotic Interference Alignment for Optimal Repair of MDS Codes in Distributed Storage", IEEE Transactions on Information Theory, vol. 59, No. 5, May 2013, pp. 2974-2987.
Cover et al., "Elements of Information Theory", Wiley, Oct. 17, 2006, 397 pgs, presented in three parts.
Desmedt et al., "Perfectly Secure Message Transmission Revisited", Proceedings of the International Conference on the Theory and Applications of Cryptographic Techniques: Advances in Cryptology, Apr. 29, 2002, 16 pgs.
Dimakis et al., "Network Coding for Distributed Storage Systems", IEEE Transactions on Information Theory, vol. 56, No. 9, Sep. 2010, 13 pgs.
Erdos et al., "Families of Finite Sets in Which No Set is Covered by the Union of r Others", Israel Journal of Mathematics, vol. 51, No. 1-2, Dec. 1985, 11 pgs.
Franklin et al., "Secure Communication in Minimal Connectivity Models", Journal of Cryptology, vol. 13, No. 1, Jan. 2000, 15 pgs.
Franklin et al., "Secure Hypergraphs: Privacy from Partial Broadcast", Proceedings of the 27th Annual ACM Symposium on Theory of Computing, Las Vegas, Nevada, May 29-Jun. 1, 1995, 13 pgs.

(56) References Cited

OTHER PUBLICATIONS

Goldreich et al., "Fault-tolerant Computation in the Full Information Model", SIAM Journal on Computing, vol. 27, No. 2, Apr. 1998, pp. 506-544.

Gopalan et al., "On the Locality of Codeword Symbols", IEEE Transactions on Information Theory, vol. 58, No. 11, Nov. 2012, 17 pgs.

Huang et al., "Characterization of Secrecy Capacity for General MSR Codes under Passive Eavesdropping Model", arXiv:1505.01986v1 [cs.IT], May 8, 2015, 17 pgs.

Huang et al., "Communication Efficient Secret Sharing", arXiv:1505.07515v1 [cs.IT], May 28, 2015, 22 pgs.

Huang et al., "Security Concerns in Minimum Storage Cooperative Regenerating Codes", arXiv:1509.01324v1 [cs.IT], Sep. 4, 2015, 23 pgs.

Ito et al., "Secret sharing scheme realizing general access structure", Electronics and Communications in Japan (Part III: Fundamental Electronic Science), vol. 72, No. 9, 1989, 10 pgs.

Jackson et al., "A Combinatorial Interpretation of Ramp Schemes", Australasian Journal of Combinatorics, vol. 14, 1996, pp. 51-60.

Kamath et al., "Codes Wth Local Regeneration and Erasure Correction", IEEE Transactions on Information Theory, vol. 60, No. 8, Aug. 2014, pp. 4637-4660.

Kautz et al., "Nonrandom Binary Superimposed Codes", IEEE Transactions on Information Theory, vol. 10, No. 4, Oct. 1964, pp. 363-377.

Kermarrec et al., "Repairing Multiple Failures with Coordinated and Adaptive Regenerating Codes", Proceedings of the International Symposium on Networking Coding, Beijing, China, Jul. 25-27, 2011, 13 pgs.

Koyluoglu et al., "Secure Cooperative Regenerating Codes for Distributed Storage Systems", IEEE Transactions on Information Theory, vol. 60, No. 9, Sep. 2014, 22 pgs.

Li et al., "Cooperative Repair with Minimum-Storage Regenerating Codes for Distributed Storage", Proceedings of the IEEE Conference on Computer Communications—INFOCUM, Toronto, Ontario, Apr. 27-May 2, 2014, 9 pgs.

Lovasz, "On Determinants, Matchings, and Random Algorithms", In Fundamentals of Computing Theory, Akademia-Verlag, Berlin, 1979, 10 pgs.

Martin et al., "Changing Thresholds in the Absence of Secure Channels", Australian Computer Journal, vol. 31, No. 2, 1999, 21 pgs.

Ogata et al., "Some Basic Properties of General Nonperfect Secret Sharing Schemes", Journal of Universal Computer Science, vol. 4, No. 8, Aug. 28, 1998, pp. 690-704.

Papailiopoulos et al., "Repair Optimal Erasure Codes Through Hadamard Designs", IEEE Transactions on Information Theory, vol. 59, No. 5, May 2013, pp. 3021-3037.

Pawar et al., "Securing Dynamic Distributed Storage Systems against Eavesdropping and Adversarial Attacks", arXiv:1009.2556v2 [cs.IT], Apr. 27, 2011, 19 pgs.

Prakash et al., "Codes with Locality for Two Erasures", Proceedings of the IEEE International Symposium on Information Theory, Honolulu, Hawaii, Jun. 29-Jul. 4, 2014, 14 pgs.

Rawat et al., "Centralized Repair of Multiple Node Failures with Applications to Communication Efficient Secret Sharing", aeXiv:1603.04822v1, Mar. 15, 2016, 37 pgs.

Rawat et al., "Cooperative local repair in distributed storage", EURASIP Journal on Advances in Signal Processing, vol. 2015, No. 107, Dec. 23, 2015, 17 pgs.

Rawat et al., "Optimal Locally Repairable and Secure Codes for Distributed Storage Systems", IEEE Transactions on Information Theory, vol. 60, No. 1, Jan. 2014, pp. 212-236.

Rouayheb et al., "Secure Network Coding for Wiretap Networks of Type II", IEEE Transactions on Information Theory, vol. 58, No. 3, Mar. 2012, 23 pgs.

Safavi-Naini et al., "Secret Sharing Schemes with Partial Broadcast Channels", Designs, Codes and Cryptography, vol. 41, No. 1, Oct. 2006, pp. 5-22.

Sasidharan et al., "A High-Rate MSR Code With Polynomial Sub-Packetization Level", arXiv:1501.06662v1 [cs.IT], Jan. 27, 2015, 5 pgs.

Scouarnec, "Exact scalar minimum storage coordinated regenerating codes", Proceedings of the IEEE International Symposium on Information Theory, Cambridge, Massachusetts, Jul. 1-6, 2012, 9 pgs.

Shah et al., "Information-theoretically Secure Regenerating Codes for Distributed Storage", arXiv:1107.5279v1 [cs.IT], Jul. 26, 2011, 6 pgs.

Shum et al., "Cooperative Regenerating Codes", arXiv:1207.6762v5 [cs.IT], Jul. 19, 2013, 29 pgs.

Song et al., "Locally Repairable Codes with Functional Repair and Multiple Erasure Tolerance", arXiv:1507.02796v3 [cs.IT], Jul. 29, 2015, 21 pgs.

Steinfeld et al., "Lattice-based threshold-changeability for standard CRT secret-sharing schemes", Finite Fields and Their Applications, vol. 12, No. 4, Nov. 2006, 28 pgs.

Steinfeld et al., "Lattice-Based Threshold-Changeability for Standard Shamir Secret-Sharing Schemes", International Conference on the Theory and Application of Cryptology and Information Security, ASIACRYPT 2004: Advances in Cryptology, 17 pgs.

Stinson et al., "Secure frameproof codes, key distribution patterns, group testing algorithms and related structures", Journal of Statistical Planning and Inference, vol. 86, No. 2, May 1, 2000, pp. 595-617.

Stinson et al., "Some New Bounds for Cover-Free Families", Journal of Combinatorial Theory, Series A, vol. 90, No. 1, Apr. 2000, pp. 224-234.

Tamo et al., "A Family of Optimal Locally Recoverable Codes", IEEE Transactions on Information Theory, vol. 60, No. 8, Aug. 2014, 16 pgs.

Wang et al., "Exact Cooperative Regenerating Codes with Minimum-Repair-Bandwidth for Distributed Storage", Proceedings of the IEEE INFOCOM, Turin, Italy, Apr. 14-19, 2013, 7 pgs.

Wang et al., "Optimal Rebuilding of Multiple Erasures in MDS Codes", arXiv:1603.01213v1 [cs.IT], Mar. 3, 2016, 22 pgs.

\* cited by examiner

| | Party 1 | Party 2 | Party 3 | Party 4 | Party 5 | Party 6 | Party 7 |
|---|---|---|---|---|---|---|---|
| | $f(1) =$ | $f(2) =$ | $f(3) =$ | $f(4) =$ | $f(5) =$ | $f(6) =$ | $f(7) =$ |
| | $m_1 + m_2 + k$ | $m_1 + 2m_2 + 4k$ | $m_1 + 3m_2 + 9k$ | $m_1 + 4m_2 + 5k$ | $m_1 + 5m_2 + 3k$ | $m_1 + 6m_2 + 3k$ | $m_1 + 7m_2 + 5k$ |

FIG. 5

| Party 1 | Party 2 | Party 3 | Party 4 | Party 5 | Party 6 | Party 7 |
|---|---|---|---|---|---|---|
| $m_1 + m_2 + k_1$ | $m_1 + 2m_2 + 4k_1$ | $m_1 + 3m_2 + 9k_1$ | $m_1 + 4m_2 + 5k_1$ | $m_1 + 5m_2 + 3k_1$ | $m_1 + 6m_2 + 3k_1$ | $m_1 + 7m_2 + 5k_1$ |
| $m_3 + m_4 + k_2$ | $m_3 + 2m_4 + 4k_2$ | $m_3 + 3m_4 + 9k_2$ | $m_3 + 4m_4 + 5k_2$ | $m_3 + 5m_4 + 3k_2$ | $m_3 + 6m_4 + 3k_2$ | $m_3 + 7m_4 + 5k_2$ |
| $m_5 + m_6 + k_3$ | $m_5 + 2m_6 + 4k_3$ | $m_5 + 3m_6 + 9k_3$ | $m_5 + 4m_6 + 5k_3$ | $m_5 + 5m_6 + 3k_3$ | $m_5 + 6m_6 + 3k_3$ | $m_5 + 7m_6 + 5k_3$ |

FIG. 6A

| Party 1 | ... | Party 7 |
|---|---|---|
| $f(1) = k_1 + m_1 + m_2 + m_3 + m_4 + m_5 + m_6$ | ... | $f(7) = k_1 + 7m_1 + 5m_2 + 2m_3 + 3m_4 + 10m_5 + 6m_6$ |
| $g(1) = k_2 + m_2 + m_4 + m_5 + m_6$ | ... | $g(7) = k_2 + 7m_2 + 7m_4 + 5m_5 + 2m_6$ |
| $h(1) = k_3 + m_3 + m_6$ | ... | $h(7) = k_3 + 7m_3 + 5m_6$ |

FIG. 6B

COMMUNICATION EFFICIENT SECRET SHARING

CROSS-REFERENCE TO RELATED APPLICATIONS

The present invention claims priority to U.S. Provisional Patent Application Ser. No. 62/167,104 entitled "Communication Efficient Secret Sharing" to Huang et al., filed May 27, 2015. The disclosure of U.S. Provisional Patent Application Ser. No. 62/167,104 is herein incorporated by reference in its entirety.

FIELD OF THE INVENTION

The present invention generally relates to information coding and more specifically relates to secret sharing.

BACKGROUND

Enormous amounts of data are generated daily by computers. Computer storage technology has evolved in response to this increase demand for storing data. Redundant array of independent disks (RAID) systems combines multiple disk drive components into a single unit accessible by a user. Data is stored across different disk drive components in various schemes to protect data if (or when) all or part of a disk drive component becomes unusable. Implementations of RAID systems can be hardware, software, and/or firmware based, and generally provide strong protections against data loss through drive failure. Individual pieces of data stored in a RAID system can be encrypted. However, this encryption is only as secure as the cryptographic key (or in some cases keys) used to encrypt those pieces of data.

SUMMARY OF THE INVENTION

Systems and methods are described for distributed storage in accordance with embodiments of the invention enable secret sharing. One embodiment includes encoding source data using an encoding system to produce a plurality of sets of encoded data, where: the source data can be recovered from at least a portion of less than all of the plurality of sets of encoded data; and the source data cannot be recovered using less than a threshold number of the plurality of sets of encoded data; storing each of the plurality of sets of encoded data on a storage device from a set of storage devices on which encoded data is stored; determining a set of storage devices that are available using a decoding system, where the set of storage devices that are available does not include all of the storage devices in the set of storage devices on which encoded data is stored; retrieving at least a portion of each of the plurality of sets of encoded data stored on a number of storage devices determined based upon the set of storage devices that are available using the decoding system; and recovering the source data from encoded data retrieved from each of the set of storage devices that are available using the decoding system.

In a further embodiment, retrieving at least a portion of each of the plurality of sets of encoded data stored on a number of storage devices determined based upon the set of storage devices that are available using the decoding system further comprises: selecting a number of storage devices from which to retrieve at least a portion of one of the plurality of sets of encoded data from a set of at least three different numbers of storage devices; wherein decoding bandwidth used to retrieve sufficient encoded data from the set of storage devices that are available to reconstruct the source data decreases with increase in the selected number of storage devices.

In another embodiment, total size of the plurality of sets of encoded data divided by the number of storage devices in the set of storage devices on which the encoded data is stored is less than the size of the source data.

In a still further embodiment, the source data is larger than at least one of the sets of encoded data in the plurality of sets of encoded data.

In still another embodiment, the source data is larger than the average size of the sets of encoded data in the plurality of sets of encoded data.

In a yet further embodiment, the source data is larger than all of the sets of encoded data in the plurality of sets of encoded data.

In yet another embodiment, decoding bandwidth used to retrieve sufficient encoded data from the set of storage devices that are available to reconstruct the source data depends upon the number of storage devices in the set of storage devices that are available and decreases with each additional storage device that is available.

In a further embodiment again, retrieving at least a portion of each of the plurality of sets of encoded data stored on each of the set of storage devices that are available utilizes a minimum decoding bandwidth necessary to retrieve sufficient encoded data from the set of storage devices that are available to reconstruct the source data.

In another embodiment again, when the number of storage devices in the set of storage devices that are available equals the threshold number, retrieving at least a portion of each of the plurality of sets of encoded data stored on each of the set of storage devices that are available comprises retrieving the entirety of each of the plurality of sets of encoded data stored on each of the set of storage devices that are available; and when the number of storage devices in the set of storage devices that are available exceeds the threshold number, retrieving at least a portion of each of the plurality of sets of encoded data stored on each of the set of storage devices that are available comprises retrieving less than the entirety of the set of encoded data stored on at least one of the set of storage devices that are available.

In a further additional embodiment, encoding source data using an encoding system comprises encoding source data using a set of polynomials.

In another additional embodiment, encoding source data using an encoding system comprises encoding source data using a set of polynomials comprises encoding the source data using a Vandermonde matrix.

In a still yet further embodiment, the set of polynomials includes a plurality of polynomials of different degrees; and one evaluation of each polynomial in the set of polynomials is stored on each of the storage devices in the set of storage devices.

In still yet another embodiment, each polynomial in the set of polynomials has: at least one coefficient that is a randomly generated key; and remaining coefficients derived from the source data.

In a still further embodiment again, the remaining coefficients derived from the source data are each portions of the source data.

In still another embodiment again, the at least one coefficient that is a randomly generated key in each polynomial in the set of polynomials are the lowest degree coefficients in the polynomials.

Another further embodiment of the method of the invention includes: polynomials in the set of polynomials having a degree that is lower than a highest degree polynomial in the set of polynomials include remaining coefficients that are derived from the coefficients of the highest degree polynomial.

Still another further embodiment of the method of the invention includes: the remaining coefficients that are derived from the coefficients of the highest degree polynomial are mapped from the coefficients of the highest degree polynomial in the same order as the coefficients of the highest degree polynomial.

In another embodiment again, polynomials in the set of polynomials having a degree that is lower than a highest degree polynomial in the set of polynomials include remaining coefficients that are derived from the coefficients of the highest degree polynomial.

In a further additional embodiment, the remaining coefficients that are derived from the coefficients of the highest degree polynomial are mapped from the coefficients of the highest degree polynomial in the same order as the coefficients of the highest degree polynomial.

In another additional embodiment, recovering the source data from encoded data retrieved from each of the set of storage devices that are available comprises: interpolating polynomials from the set of polynomials having degree that is one less than the number of physical storage devices in the set of storage devices that are available; successively interpolating additional polynomials from the set of polynomials until the source data is recovered by recovering the coefficients of the highest degree polynomial.

In a still yet further embodiment, encoding source data comprises multiplying the source data and a plurality of randomly generated keys by an encoding matrix; and the encoding matrix is an encoding matrix of a Reed-Solomon code based upon the set of polynomials.

In still yet another embodiment, recovering the source data from encoded data retrieved from each of the set of storage devices that are available comprises multiplying the encoded data retrieved from each of the set of storage devices that are available by the inverse of at least a submatrix of the encoding matrix.

In a still further embodiment again, the decoder is a standard Reed-Solomon decoder.

In still another embodiment again, the set of polynomials forms a set of encoding matrices; and encoding source data to generate a set of encoded data comprises multiplying the source data and a plurality of randomly generated keys by an encoding matrix from the set of encoding matrices.

Another further embodiment of the method of the invention includes: the storage devices in the set of storage devices on which encoded data is stored are separate physical storage devices.

Still another further embodiment of the method of the invention includes: wherein the storage devices in the set of storage devices on which encoded data is stored are virtual storage devices defined with respect to at least one physical storage device.

In another embodiment again, a method of retrieving source data securely stored on a set of physical storage devices as a plurality of sets of encoded data, comprising: determining a set of storage devices that are available from a set of storage devices on which encoded data is stored using a decoder, where the set of storage devices that are available does not include all of the storage devices in the set of storage devices on which encoded data is stored; retrieving at least a portion of each of a plurality of sets of encoded data using a decoder, where each of the plurality of sets of encoded data is stored on one of the set of storage devices that are available; and recovering the source data from encoded data retrieved from each of the set of storage devices that are available using a decoder, where: the source data can be recovered from at least a portion of less than all of the plurality of sets of encoded data; and the source data cannot be recovered using less than a threshold number of the plurality of sets of encoded data.

In a further additional embodiment, retrieving at least a portion of each of the plurality of sets of encoded data utilizes a minimum decoding bandwidth necessary to retrieve sufficient encoded data from the set of storage devices that are available to reconstruct the source data.

In another additional embodiment, a secure method for distributed storage of data, comprising: encoding source data using an encoding system to produce a plurality of sets of encoded data, where: the source data is larger than at least one of the sets of encoded data in the plurality of sets of encoded data; the source data can be recovered from at least a portion of less than all of the plurality of sets of encoded data; and the source data cannot be recovered using less than a threshold number of the plurality of sets of encoded data; storing each of the plurality of sets of encoded data on a separate physical storage device from a set of physical storage devices on which encoded data is stored; determining a set of separate physical storage devices that are available using a decoding system, where the set of separate physical storage devices that are available does not include all of the physical storage devices in the set of physical storage devices on which encoded data is stored; retrieving at least a portion of each of the plurality of sets of encoded data stored on a number of storage devices determined based upon the set of storage devices that are available using the decoding system, where: when the number of physical storage devices in the set of physical storage devices that are available equals the threshold number, retrieving at least a portion of each of the plurality of sets of encoded data stored on each of the set of physical storage devices that are available comprises retrieving the entirety of each of the plurality of sets of encoded data stored on each of the set of physical storage devices that are available; and when the number of physical storage devices in the set of physical storage devices that are available exceeds the threshold number, retrieving at least a portion of each of the plurality of sets of encoded data stored on each of the set of physical storage devices that are available comprises retrieving less than the entirety of the set of encoded data stored on at least one of the set of physical storage devices that are available; and decoding bandwidth used to retrieve sufficient encoded data from the set of storage devices that are available to reconstruct the source data decreases with increase in the number of storage devices from which encoded data is retrieved; and recovering the source data from encoded data retrieved from each of the set of physical storage devices that are available using the decoder.

BRIEF DESCRIPTION OF THE DRAWINGS

FIG. 5 is a diagram illustrating Shamir's ramp scheme.

FIG. 6A is a diagram illustrating Shamir's ramp scheme repeated three times.

FIG. 6B is a diagram illustrating a secret sharing process utilizing three functions in accordance with an embodiment of the invention.

DETAILED DESCRIPTION

Figure 1A:
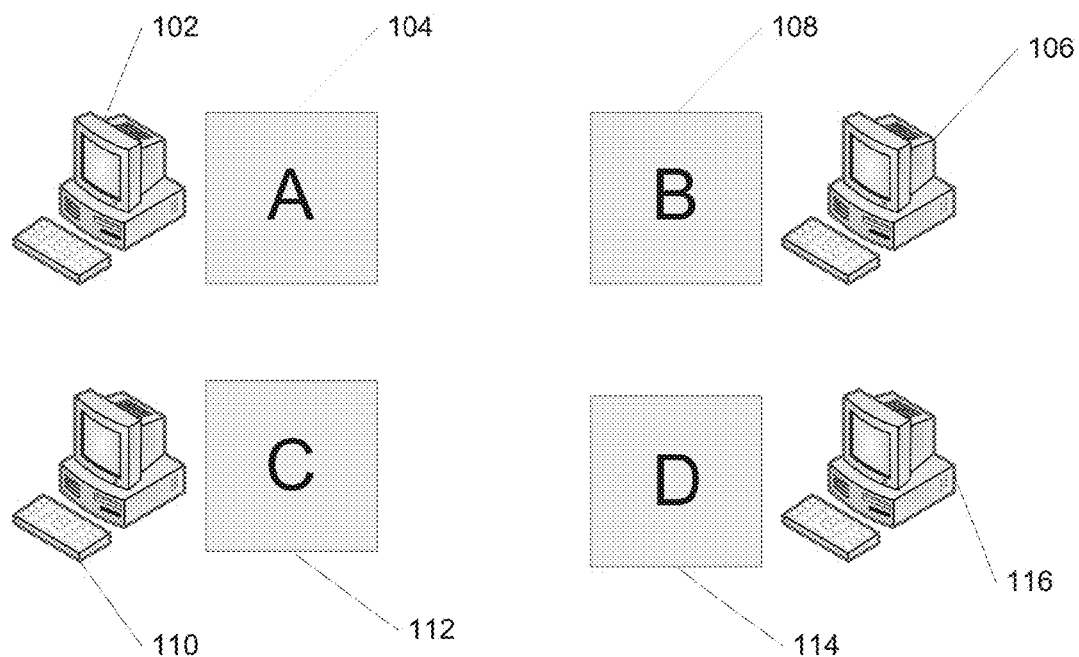
FIGS. 1A-1B conceptually illustrate a secret sharing scheme in accordance with an embodiment of the invention.

Turning now to the drawings, storage systems and methods of securely storing data in a distributed manner that enables communication efficient retrieval of the stored data in accordance with various embodiments of the invention are illustrated. While distributing data across a number of storage locations can provide increased security, the security comes at the expense of the bandwidth required to obtain an amount of encoded data from storage sufficient to decode the original data. Systems and methods in accordance with many embodiments of the invention, use a secret sharing scheme that encodes data in a manner that enables recovery in a communication efficient manner. Storage systems in accordance with a number of embodiments of the invention can recover data stored within the system using a total amount of encoded data from the distributed storage locations, which can be shown to be the theoretical minimum amount of data required to decode the original data given the available number of storage locations from which encoded data can be retrieved. Examples of reasons that data may not be available from a specific storage location include (but are not limited to) a hard disk failure and/or compromise of a computing system by a security threat.

The amount of encoded data retrieved from storage locations to decode the stored data can be referred to as the decoding bandwidth. A smaller decoding bandwidth is generally obtained by retrieving smaller amounts of encoded data from each storage location. Therefore, the ability to adjust the amount of encoded data retrieved from each available storage location based upon the number of available storage locations and yet still be able to recover the original data increases the flexibility of the storage system. As is discussed further below, this flexibility in storage systems in accordance with many embodiments of the invention enables optimal utilization of decoding bandwidth in the retrieval of data securely stored within the storage system.

The term secret sharing scheme is typically used to refer to a method of storing information securely and reliably. In many embodiments, data is stored by performing sets of computations and storing the results in a number of different storage locations. The results can be referred to as encoded data or "shares". Typically, each piece of encoded data is different and encoded in such a way that the original data can be recovered without access to all of the different pieces of encoded data that are stored in the different locations. Such a scheme is referred to as a threshold secret sharing scheme, where the original data is encoded into n pieces of encoded data, such that the original data can be decoded from any set of at least $t_1$ pieces of encoded data, and the original data cannot be recovered from any set of at most $t_2 < t_1$ pieces of encoded data. In contrast to cryptographic systems in which a subset of data can be accessed by compromising the cryptographic keys used to encrypt the subset of data, the set of at most $t_2 < t_1$ pieces of encoded data in the threshold secret sharing schemes described herein simply does not contain enough information to recover the original data.

In various embodiments, threshold access structures are utilized. Threshold access structures can be decoded without all the storage locations, which can be referred to as nodes, communicating and prevent a certain number of parties from colluding to uncover the secret data. Known secret sharing schemes for threshold access include (but are not limited to) Shamir's scheme. Other information theory schemes which can be utilized include (but are not limited to) Reed-Solomon codes and random codes. Various embodiments of the present invention adapt these existing schemes to increase communication efficiency in the decoding process.

In various embodiments, decreased decoding bandwidth is achieved by utilizing functions to store secret symbols (i.e. encoded data). Generally, each node will store at least a subset of evaluations of the functions. The functions can then be interpreted by downloading the evaluations from available nodes. In many situations (depending on the number of available nodes, described in more detail further below), not all of the evaluations will be needed from each node in order to recover data. In these situations, only part of the information stored in each available node is downloaded. The ability to vary the amount of data that can be downloaded from each node can be achieved by careful and flexible design of the numbers and degrees of polynomials, as well as the arrangement of their coefficients, utilized in the functions used to encode the data. In several embodiments that involve the use of Shamir's scheme, the functions map high-degree coefficients of the higher degree polynomials into the coefficients of the lower degree polynomials. In certain embodiments, a subset of the lowest degree coefficients in the polynomials are independent keys. In alternative embodiments, a subset of consecutive coefficients are independent keys. The remaining coefficients can be utilized to encode information (i.e. message symbols and coefficients of higher degree polynomials). In a number of embodiments, construction of the polynomials used in encoding in this manner enables decoding using a total number of message symbols and a total number of key symbols that are fixed. In several embodiments that utilize Reed-Solomon codes, the use of Reed-Solomon codes in the encoding means that the decoding process can tolerate partial erasures distributed across the nodes and still recover the securely stored data in a communication optimal manner. In this way, less than the total amount of encoded data stored at the available nodes can be downloaded when recovering the securely stored data. The ability to download only a portion of the encoded data stored at the nodes from which data is retrieved can decrease downloading bandwidth.

When a user connects to more nodes, the increased latency may offset the benefit of the reduced bandwidth. One can overcome this issue by avoiding connections to nodes of large latency. If the latency of the nodes are not known a prior, one can start with connecting to all nodes and downloading the evaluations of the polynomials in decreasing order of degrees. If some nodes do not respond in time, consider them as not available and switch adaptively to the mode of decoding from a smaller number of nodes. Storage systems and methods of securely storing data in a distributed manner that enables communication efficient retrieval of the stored data in accordance with various embodiments of the invention are discussed further below.

Secret Sharing

Figure 1B:
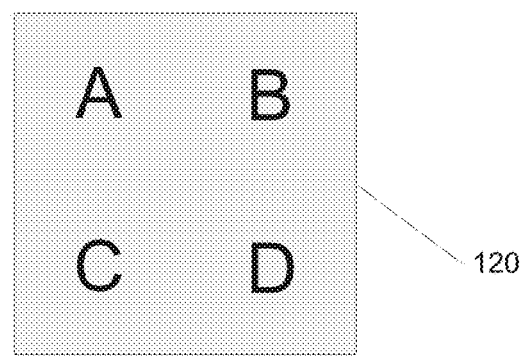

FIGS. 1A-1B conceptually illustrate a secret sharing scheme in which stored data is encoded into four sets of encoded data. Node 102 stores a first set of encoded data A 104. Similarly node 106 stores a second set of encoded data B 108, node 110 stores a third set of encoded data C 112, and node 114 stores a fourth set of encoded data D 116. In various embodiments, information stored in nodes 102, 106, 110, and/or 116 can be encoded using any of a variety of schemes including (but not limited to) Shamir's scheme. Reed-Solomon codes, and/or random codes. In various embodiments, nodes can be (but are not limited to) any combination of a computing devices and/or services such as a personal computer, tablet, and/or cellular telephone, an individual hard disk drive, a disk within a multiple-disk hard disk drive within a computing device, any other physical memory stores (including but not limited to USB thumb drives or other forms of physical media such as floppy disks) and/or cloud storage.

In several embodiments, information is distributed across the four nodes 102, 106, 110, and 114 so that each node only contains part of the information. The sets of encoded data A 104, B 108, C 112, and D 116 can be utilized to decode complete information 120 as illustrated in FIG. 1B. At least a subset of nodes 102, 106, 110, and 114 must communicate to generate the complete information. Information can be kept secret in this manner, because multiple nodes must communicate to discover the secret. It should readily be apparent that FIGS. 1A-1B are merely illustrative and different combination can be spread across different numbers of nodes as appropriate to the requirements of specific applications.

Although various secret sharing schemes are described above with reference to FIGS. 1A-1B, any of a variety of techniques for securely storing information across a number of nodes that quantify, store, and/or communicate information can be utilized as appropriate to the requirements of specific applications in accordance with various embodiments of the invention. Nodes that utilize node controllers to store and decode encoded information in accordance with several embodiments of the invention are described below.

Nodes Utilizing Node Controllers

Figure 2:
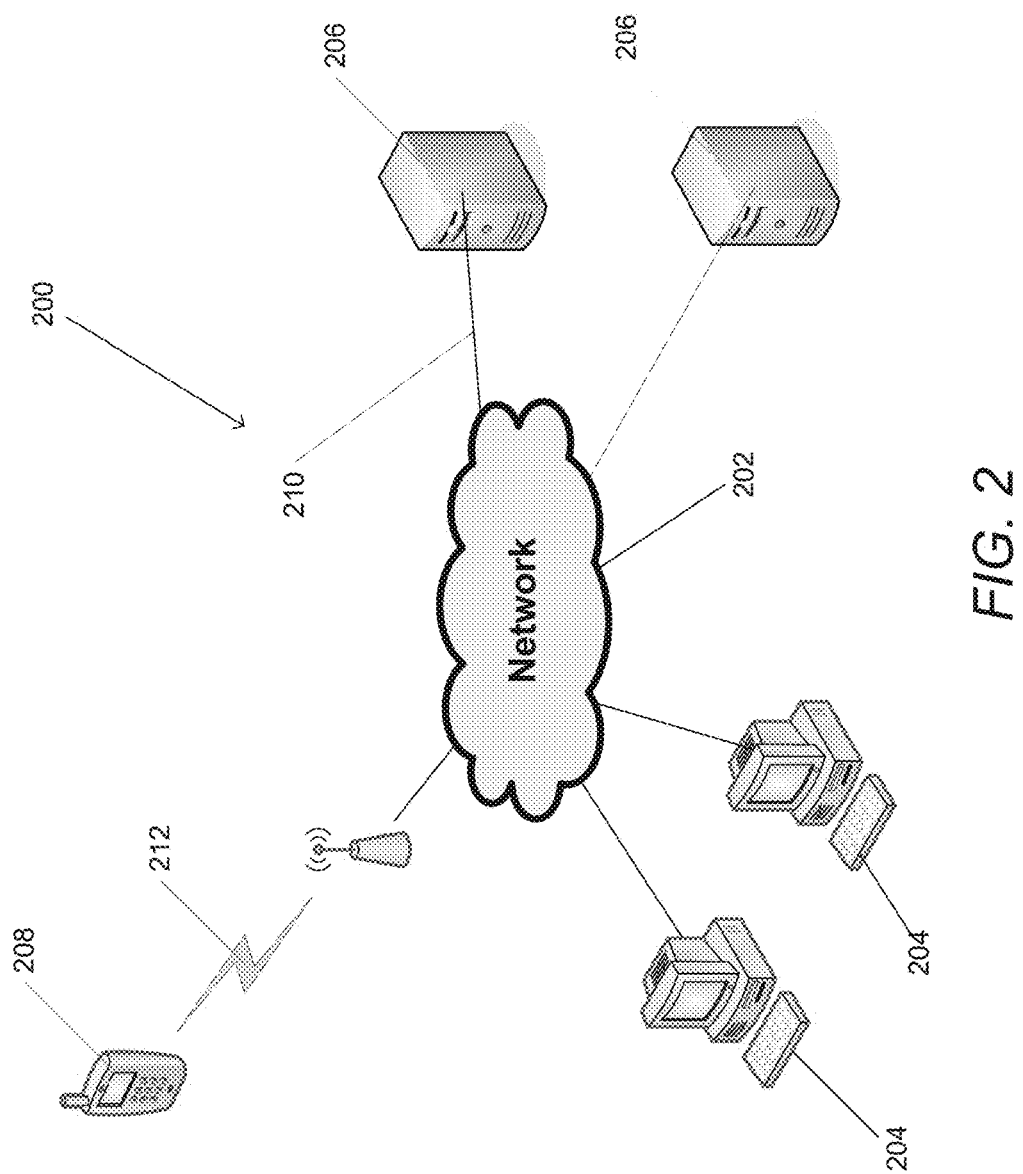
FIG. 2 conceptually illustrates nodes utilizing node controllers for decreasing decoding bandwidth in accordance with an embodiment of the invention.

Nodes utilizing node controllers that efficiently utilize decoding bandwidth when recovering stored at a in accordance with several embodiments of the invention are conceptually illustrated in FIG. 2. As described above, nodes can store portions of shared secret information. In various embodiments, nodes can be a combination of (but are not limited to) computing devices such as a personal computer, tablet, and/or cellular telephone, an individual hard disk drives within a computing device (for example hard disks in a Redundant Array of Inexpensive Disks (RAID) system), and/or other physical memory stores (including but not limited to USB thumb drives or other forms of physical media such as floppy disks). A variety of nodes connect to network 202 including personal computer 202, server 206, and cellular telephone 208. These connections can be a combination of wired 210 and/or wireless 212 connections. These nodes can utilize a node controller to implement a secret sharing process in accordance with various embodiments of the invention described in greater detail below.

It should readily be apparent that any number and any combination of different kinds of nodes as described above can be utilized and can connect to a network in accordance with various embodiments of the invention. Furthermore, nodes need not be connected via a network. As can readily be appreciated, nodes can be located within a single computing device. Although a variety of nodes utilizing secret sharing controllers are described above with reference to FIG. 2, any of a variety of data storage combinations can be utilized as appropriate to the requirements of specific applications in accordance with various embodiments of the invention. Node controllers that utilize secret sharing applications are described below.

Node Controllers

Figure 3:
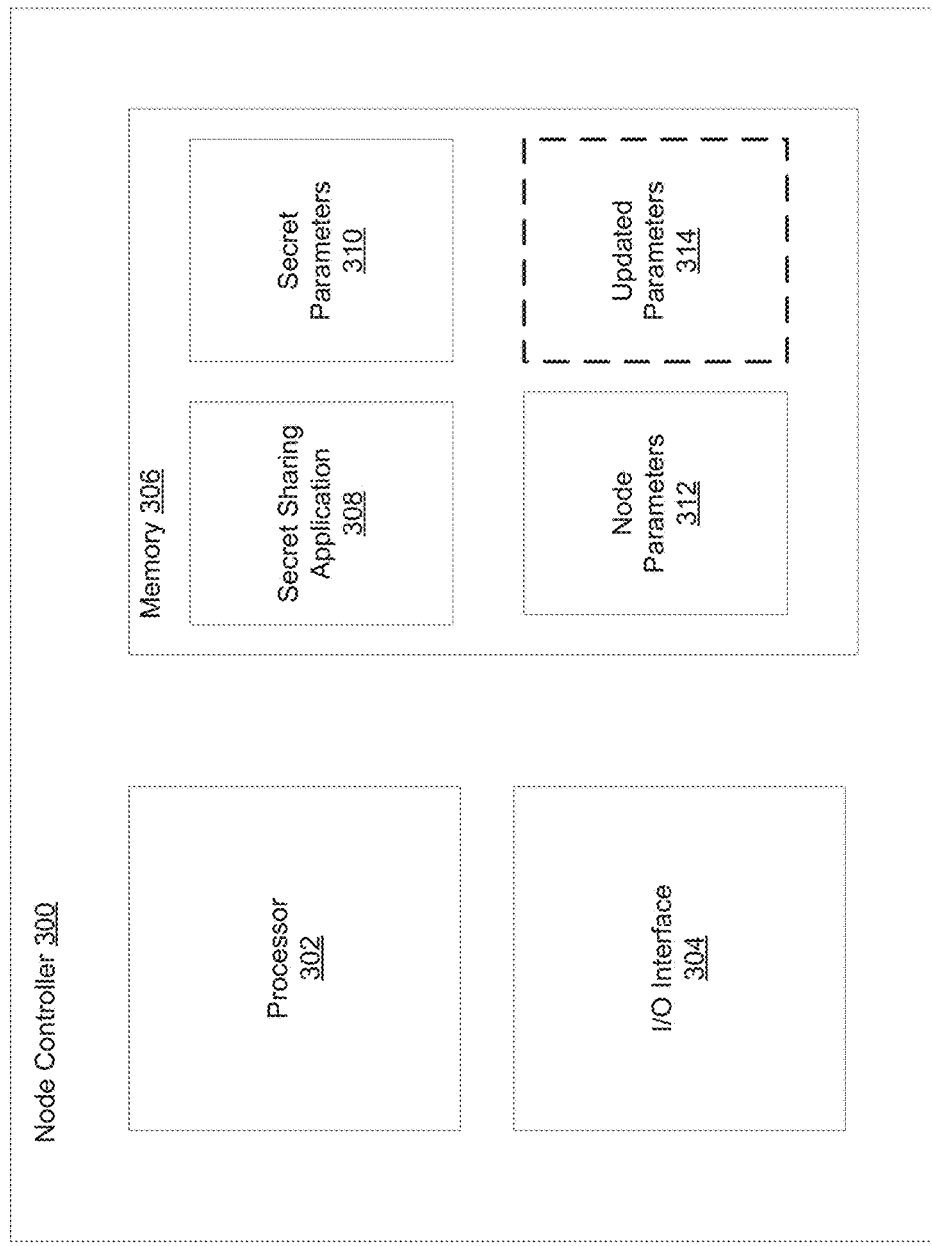
FIG. 3 is a block diagram illustrating node controllers utilizing secret sharing applications in accordance with an embodiment of the invention.

Secret sharing controllers which implement secret sharing applications in accordance with many embodiments of the invention are described in FIG. 3. In several embodiments, node controller 300 can generate secret sharing schemes which linearly scale with respect to the number of nodes. The node controller includes at least one processor 302, an I/O interface 304, and memory 306. The at least one processor 302, when configured by software stored in memory, can perform calculations on and make changes to data passing through the I/O interface as well as data stored in memory. In many embodiments, the memory 306 includes software including the secret sharing application 308, as well as secret parameters 310, node parameters 312, and updated parameters 310. A node can communicate with other nodes to distribute and/or reconstruct a shared secret. In various embodiments, secret parameters 310 can include expressions of functions utilized to store the secret as described further below. Additional information about the nodes is stored in the node parameters 312. Updated parameters 310 can include (but is not limited to) information about which other nodes are available during decoding and/or functions solved from expressions stored in the node. In several embodiments, nodes encode and/or decode portions of the secret. Secret sharing application 308 can utilize various schemes (including but not limited to) Shamir's scheme, Reed-Solomon codes, and/or random codes in implementing encoding and decoding in a manner that can minimize the communication between nodes by achieving optimal decoding bandwidth. Although a variety of node controllers are described above with reference to FIG. 3, any of a variety of node controllers for secret sharing applications can be utilized as appropriate to the requirements of specific applications in accordance with embodiments of the invention. For example, node controllers can be implemented directly in hardware so that encoding and decoding processes are performed within circuitry and/or a combination of circuitry and a processor configured by machine readable instructions. Processes for secret sharing in accordance with many embodiments of the invention are described below.

Secret Sharing Processes

Figure 4:
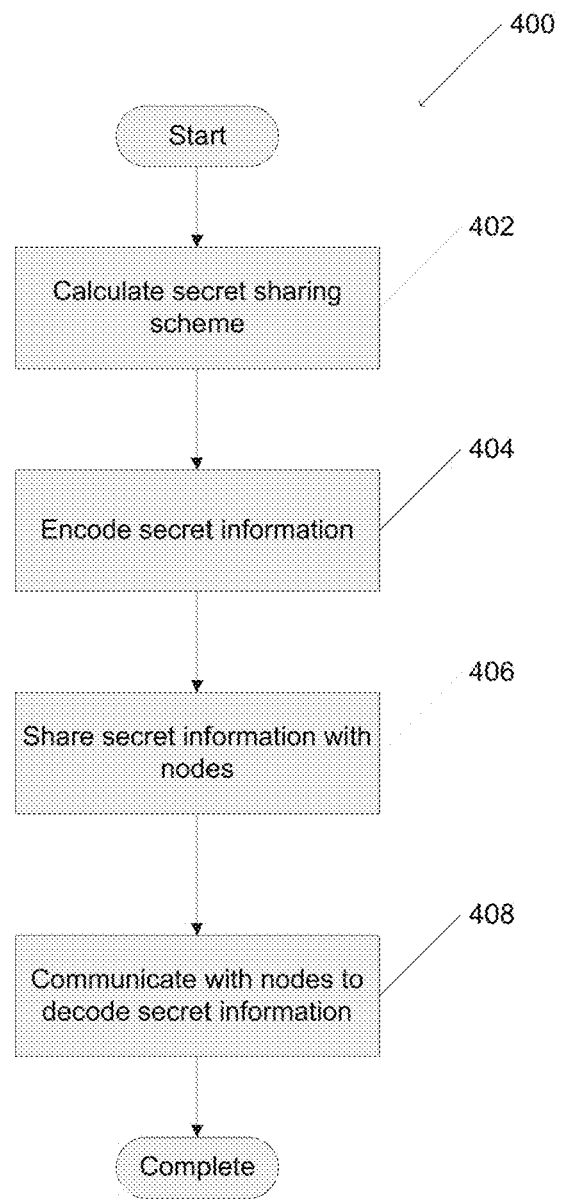
FIG. 4 is a flowchart illustrating secret sharing processes to decrease decoding bandwidth in accordance with an embodiment of the invention.

An overview of a process 400 for secret sharing that minimizes the bandwidth utilized to decode encoded information stored in accordance with various embodiments of the invention is illustrated in FIG. 4. A secret sharing scheme which achieves optimal decoding bandwidth is calculated 402. The secret sharing scheme can be constructed from (but not limited to) Shamir's scheme, Reed-Solomon codes, and/or random codes as described in detail further below. In several embodiments, the communication between the nodes decreases as the number of nodes increases, thus achieving optimal decoding bandwidth. The secret information is then encoded 404 utilizing any of a variety of schemes appropriate for the secret sharing scheme calculated including (but not limited to) Shamir's scheme. Reed-Solomon codes, and/or random codes. Encoding processes in accordance with various embodiments of the invention that utilize Shamir's scheme, Reed-Solomon codes, and random codes are described in greater detail below. Encoded information is shared with the appropriate nodes 406. The encoded information can be decoded 408 by communicating with the available nodes. Decoding processes using Shamir's scheme, Reed-Solomon codes, and random codes are also described in greater detail below. Although a variety of secret sharing processes achieving optimal decoding bandwidth are described with respect to FIG. 4, any of a variety of secret sharing processes can be utilized as appropriate to the requirements of specific applications in accordance with various embodiments of the invention. Schemes to distribute secret information to various nodes in accordance with many embodiments of the invention are described below.

Schemes for Distribution of Secrets to Nodes

In various embodiments, consider the scenario that n nodes are available to store a secret securely and reliably. To this end, a storage system encodes secret data into n shares. i.e., one share for each node, such that 1) (reliability) a collection $\mathcal{A}$ of encoded data from an "authorized" subsets of nodes can be used to decode the secret, and 2) (secrecy) a collection $\mathcal{B}$ of encoded data from "blocked" subsets of the nodes cannot be used to obtain any information about the secret. A scheme to distribute the secret into shares with respect to access structure ($\mathcal{A}$, $\mathcal{B}$) is called a secret sharing scheme, initially studied in the seminal works by Shamir and Blakley. A secret sharing scheme is perfect if a subset of parties is either authorized or blocked, i.e., $\mathcal{A} \cup \mathcal{B} = 2^{\{1,\ldots,n\}}$. The scheme is referred to as a ramp scheme if it is not perfect.

Many embodiments of the present invention focus on secret sharing schemes for the threshold access structure. i.e., $\mathcal{A}$ contains all subsets of $\{1, \ldots, n\}$ of size at least n−r, and $\mathcal{B}$ contains all subsets of $\{1, \ldots, n\}$ of size at most z. In other words, the secret can be decoded in the absence of any r nodes, and the encoded data from any z nodes cannot be used to deduce any information about the secret. The threshold access structure is particularly important in practice, because for this case, space and computationally efficient secret sharing schemes are known. Specifically, Shamir constructs an elegant and efficient perfect threshold scheme using the idea of polynomial interpolation. Shamir's scheme can be shown to be closely related to Reed-Solomon codes and is generalized to ramp schemes, which have significantly better space efficiency, i.e., rate, than the original perfect scheme. Shamir's scheme and the generalized ramp schemes achieve optimal usage of storage space, in the sense that fixing the size of the shares, the schemes store a secret of maximum size. The schemes are computationally efficient as decoding the secret is equivalent to polynomial interpolation. An example of Shamir's ramp scheme is shown in FIG. 5. FIG. 5 illustrates Shamir's scheme (ramp version) for n=7, r=4, z=1, with symbols over $\mathbb{F}_{11}$. The scheme stores a secret of two symbols, denoted by $m_1$, $m_2$. Let k be a uniformly and independently distributed random variable, f(x) is the polynomial $m_1+m_2x+kx^2$. Note that the share stored by any single party is independent of the secret because it is padded by k, and that the secret can be decoded from the shares stored by any three nodes (referred to as parties) by polynomial interpolation.

In addition to space and computational efficiency, many processes in accordance with the present invention utilize communication efficiency for secret sharing schemes. Consider the scenario that a user wishes to decode the secret by downloading information from the nodes (referred to in FIG. 5 as parties) that are available. Referring to the amount of information downloaded by the user as the decoding bandwidth, a natural question is to address the minimum decoding bandwidth that allows decoding. In several embodiments, it is of practical interest to design secret sharing schemes that achieve a small decoding bandwidth, or in other words, that require communicating only a small amount of information during decoding. In such a case, decoding will be completed in a timely manner and the communication resource will be more efficiently utilized.

In many existing secret sharing schemes, a common practice in decoding is that the user will communicate with a minimum set of parties, i.e., exactly n−r nodes (even if d>n−r nodes are available) and download the whole share stored by these nodes. It can be show that this paradigm is not optimal in terms of communication and that the decoding bandwidth can be reduced if the user downloads only part of the share from each of the d>n−r available nodes. Specifically, given d, for any perfect threshold secret sharing scheme, a lower bound can be derived on the decoding bandwidth when exactly d nodes participate in decoding, and a perfect scheme can be designed that achieves the lower bound. However, two interesting and important problems remain open: 1) some schemes achieve the lower bound on decoding bandwidth when the number of available nodes d equals a single specific value, and do not achieve the bound if d takes other values. This raises the question whether the lower bound is uniformly tight, or in other words, it is possible to design a single scheme that achieves the lower bound universally for all d in the range of [n−r, n−r+1, . . . , n], 2) It is well known that for any perfect scheme, the size of each share is as large as the size of the secret, i.e., the rate of a perfect scheme is at most 1/n. (The rate is the ratio of the size of the secret to the total size of all shares, measured in the number of $\mathbb{F}_q$ symbols.) Any scheme with a higher rate is necessarily a (non-perfect) ramp scheme, which raises the question of how to generalize the results and ideas to non-perfect schemes.

The first problem addresses the flexibility of a scheme in terms of decoding, and the second problem addresses the high-rate case which is a typical requirement in many practical applications. In some embodiments of the present invention, both problems can be settled and perfect and ramp schemes can be constructed of flexible rate that achieve the optimal decoding bandwidth universally. Similar to Shamir's scheme, various embodiment of the present invention are computationally efficient and have optimal space efficiency.

Secret Sharing Processes

Shamir's ramp scheme can be considered in the example of FIG. 5, that stores 2 symbols securely and reliably for the setting n=7, r=4 and z=1. In order to decode the secret, a user needs to download 3 symbols from any 3 parties, and therefore the decoding bandwidth is 3 symbols. FIGS. 6A-6B illustrates two secret sharing schemes for n=7, r=4 and z=1 over $\mathbb{F}_{11}$. Both schemes store a secret of six symbols ($m_1, \ldots, m_6$). In both schemes, $k_1, k_2, k_3$ are i.i.d. uniformly distributed random variables. Scheme (a) is Shamir's scheme repeated three times. In scheme (b), $f(x)=k_1+m_1x+m_2x^2+m_3x^3+m_4x^4+m_5x^5+m_6x^6$, $g(x)=k_2+m_4x+m_5x^2+m_6x^3$, $h(x)=k_3+m_3x+m_6x^2$, and party i stores evaluations f(i), g(i) and h(i). Note that in (b), if all 7 parties are available, then the secret can be decoded by downloading only one symbol f(i) from each party i, and then interpolating f(x). If any 4 parties are available, then the secret can be decoded in the following way. Download two symbols f(i),g(i) from each available party i and first interpolate g(x), implying that all coefficients of f(x) of degree larger than 3 are decoded. The remaining unknown part of f(x) is a degree-3 polynomial and so we have enough evaluations of f(x) to interpolate it, hence completely decoding the secret.

Similarly, if any 3 parties are available, then the secret can be decoded in the following way. Download all three symbols f(i), g(i), h(i) from each available node i and interpolate h(x), which decodes the degree-3 coefficients of f(x) and g(x). Hence the remaining unknown part of g(x) is a degree-2 polynomial and can be interpolated, which decodes the coefficients of f(x) of degrees 4, 5, 6. Hence the remaining unknown part of f(x) is a degree-2 polynomial and can be interpolated, decoding the complete secret. This shows that the scheme meets the reliability requirement. In fact, for d=3, 4, 7, scheme (b) achieves the optimal decoding bandwidth when d parties participate in decoding. The secrecy of the scheme derives from the secrecy of Shamir's scheme, as each polynomials f(x), g(x) and h(x) individually is an instance of Shamir's scheme, and we show that combining them still meets the secrecy requirement. The construction of this process is discussed in detail in below.

Now suppose the same scheme is repeated 3 times in order to store a secret of 6 symbols, as shown in FIG. 6A. Then to decode the secret, the decoding bandwidth is 9 symbols. A new scheme in accordance with several embodiments of the invention is proposed in FIG. 6B that also stores a secret of 6 symbols for the same setting, using the same amount of storage space, and over the same field size. In this scheme, if any 3 parties are available, then similar to Shamir's scheme, the secret can be decoded from the 9 symbols stored by the three parties. However, if any 4 parties are available, then the secret can be decoded by downloading 2 symbols from each available party. Therefore, the decoding bandwidth is improved to 8 symbols. If all 7 parties are available, then the secret can be decoded by downloading only 1 symbol from each party and so the decoding bandwidth is further reduced to 7 symbols.

The illustrative examples in FIGS. 6A-6B highlight several ideas in accordance with several embodiments of the invention to reduce the decoding bandwidth. Firstly, the amount of communication depends on the number of available parties. In fact the necessary amount of communication decreases strictly as the number of available parties increases. Secondly, it is important to distribute multiple subshares (symbols) to a party (in many embodiments utilizing the ideas of array codes). In contrast, Shamir's scheme only distributes one symbol to each party except for trivial repetitions. Thirdly, during decoding it is not always necessary to download the complete share stored by a party. In general, a party can preprocess its share and the user can download a function of the share.

Comparing this process to other schemes, the scheme in accordance with various embodiments of the invention is improved and generalized in the following aspects, 1) The proposed scheme achieves the optimal bandwidth more flexibly. Specifically, the previous schemes achieve the optimal bandwidth for a single specific number of available parties. The proposed scheme in accordance with many embodiments of the invention is more flexible as it can be designed to allow flexibility in the number of available parties d. In the example of FIG. 6B the scheme achieves the optimal bandwidth when d=3, 4, 7. In general, a process in accordance with many embodiments of the invention can construct schemes that achieve the optimal bandwidth for all n−r≤d≤n. 2) The proposed scheme can be more flexible in rate and hence space efficiency. Specifically, the previous (perfect) schemes have rate exactly 1/n. The proposed scheme in the example has rate 2/7>1/n=1/7. In general, a process in accordance with several embodiments of the invention can construct schemes of arbitrary rate.

Many embodiments of the present invention utilize an interesting analog between communication efficient secret sharing and the well-studied subject of regenerating codes. Consider a regenerating code of length n that is able to correct r>1 erasures. If only one erasure occurs, then compared to repairing from a minimum set of n−r nodes, repairing from all the n−1 available nodes will significantly reduce the total amount of communication that occurs during the repair. In this sense, for both regenerating codes and communication efficient secret sharing, a key idea is to involve more available nodes/parties than the minimum required set during repair/decoding, for the purpose of reducing the repair/decoding bandwidth.

A tight information-theoretic lower bound on the decoding bandwidth, given a set of available parties $I \subset \{1, \ldots, n\}$ will be shown further below. The bound implies that the decoding bandwidth decreases as |I| increases. The lower bound applies to both perfect and ramp schemes. Particularly, it can be show that the overhead in communication for the case of |I|=n is only a fraction (n−r−z)/(n−z) of the communication overhead when |I|=n−r.

Efficient secret sharing schemes in accordance with many embodiment of the invention are constructed further below. The construction utilizes Shamir's scheme and achieves the optimal decoding bandwidth universally for all $I \in \mathcal{A}$. Additionally, the construction preserves the simplicity of Shamir's scheme and is efficient in terms of both space and computation. Specifically, the scheme achieves optimal space efficiency, and requires the same field size as Shamir's scheme. Encoding and decoding the scheme is also similar to encoding and decoding Shamir's scheme. The scheme shows that the lower bound is uniformly tight. The flexibility of the process in accordance with various embodiments of the invention allows improved efficiency in terms of computation, decoding delay and partial decoding.

A process to construct another secret sharing scheme from Reed-Solomon codes in accordance with many embodiments of the invention is described further below. The scheme achieves the optimal decoding bandwidth when |I|=n and |I|=n−r. The scheme also offers a stronger level of reliability in that it allows decoding even if more than r shares are partially lost. A scheme from random linear codes that achieves the optimal decoding bandwidth universally is described further below.

In storage applications (where each party is regarded as a disk), it can be desirable to optimize the efficiency of disk operations. The lower bound on the decoding bandwidth is naturally a lower bound on the number of symbol-reads from nodes during decoding. In various embodiments of the present invention, the number of symbol-reads during decoding equals to the amount of communication. Therefore, processes in accordance with several embodiments of the present invention are also optimal in terms of disk operations. In addition, by involving more than the minimum number of disks for decoding, schemes balance the load at the disks and achieve a higher degree of parallelization.

Threshold Secret Sharing Processes

Consider a threshold secret sharing scheme which stores a secret message m securely and reliably into n shares, so that 1) m can be recovered from any n−r shares, and 2) any z shares do not reveal any information about m, i.e., they are statistically independent. Q can be a general Q-ary alphabet, i.e., |Q|=Q. Denote by $[n]=\{1, \ldots, n\}$. For any index set $I \subset [n]$ and a vector $c=(c_1, \ldots, c_n)$, denote by $c_I = (c_i)_{i \in I}$.

Definition 1.

An $(n,k,r,z)_Q$ secret sharing scheme consists of a randomized encoding function F that maps a secret $m \in Q^k$ to $c=(c_1, \ldots, c_n)=F(m) \in Q^n$, such that
1) (Reliability) The secret m can be decoded from any n−r shares (entries) of c. This guarantees that m is recoverable in the loss of any r shares. Formally, $$H(m|c_I)=0, \forall I \subset [n], |I|=n-r. \quad (1)$$

Therefore for any $I \subset [n]$, $|I|=n-r$, there exists a decoding function $D_I^*: Q^{n-r} \to Q^k$ such that $D_I^*(c_I)=m$.
2) (Secrecy) Any z shares of c do not reveal any information about m. This guarantees that m is secure if any z shares are exposed to an eavesdropper. Formally, $$H(m|c_I)=H(m), \forall I \subset [n], |I|=z. \quad (2)$$

The rate of a scheme can be defined to be k/n, which measures the space efficiency. The following proposition gives an upper bound on the rate.

Proposition 1.

For any $(n,k,r,z)_Q$ secret sharing scheme, it follows that $$k \le n-r-z, \quad (3)$$

and so the rate of the scheme is at most $$\frac{n-r-z}{n}.$$

A secret sharing scheme is rate-optimal if it achieves equality in (3). Note that the scheme is a perfect scheme if $z=n-r-1$ and is a ramp scheme otherwise. Rate-optimal perfect secret sharing schemes are studied by Shamir, and are later generalized to ramp schemes. Note that by (3) the rate of any perfect scheme is at most 1/n as k=1. Any scheme of a higher rate is necessarily a ramp scheme.

Lower Bounds on Communication

Suppose that the n shares of the secret are stored by n parties or distributed storage nodes, and a user wants to decode the secret. (In what follows parties and nodes are not distinguished between.) By Definition 1, the user can connect to any n−r nodes and download one share, i.e., one Q-ary symbol, from each node. Therefore, by communicating n−r symbols, the user can decode a secret of $k \le n-r-z$ symbols. It is clear that a communication overhead of z symbols occurs during decoding. The reduction of communication overhead in such a scheme will be discussed below.

There are two key ideas for improving the communication overhead. Firstly, in many practical scenarios and particularly in distributed storage systems, often time more than n−r nodes are available. In this case, it is not necessary to restrict the user to download from only n−r nodes. Secondly, it is not necessary to download the complete share stored by the node. Instead, it may suffice to communicate only a part of the share or, in general, a function of the share. In other words, a node can preprocess its share before transmitting it to the user.

Motivated by these ideas, for any $I \subset [n]$, $|I| \ge n-r$, a class of preprocessing functions $E_{I,i}: Q \to S_{I,i}$ can be defined where $|S_{I,i}| \le |Q|$, that maps $c_i$ to $e_{I,i}=E_{I,i}(c_i)$. Let $e_I=(e_{I,i})_{i \in I}$, and define a class of decoding functions $D_I: \Pi_{i \in I} S_{I,i} \to Q^k$, such that $D_I(e_I)=m$. For a naive example, consider any I such that $|I|=n-r$. Then for $i \in I$, let $S_{I,i}=Q$, let $E_{I,i}$ be the identity function, and let $D_I$ be the naive decoding function $D_I^*$ described in Definition 1. In the remaining discussion below, I, when it is clear from the context, will be suppressed in the subscripts of $S_{I,i}$, $E_{I,i}$, $e_{I,i}$ and $e_I$, and instead denoted by $S_i$, $E_i$, $e_i$ and e. Further note that all log functions described herein are base Q. The communication overhead process will be defined below.

Definition 2.

For any I such that $|I| \ge n-r$, the communication overhead process can be defined to be $CO(I)=\Sigma_{i \in I} \log |S_{I,i}|-k$. Namely, CO(I) is the amount of extra information, measured in Q-ary symbols, that one needs to communicate in order to decode a secret of k symbols, provided that the set of available shares is indexed by I.

The following provides a lower bound on the communication overhead function. It generalizes the lower bound for perfect schemes, i.e., schemes with k=1.

Theorem 1.

For any $(n,k,r,z)_Q$ secret sharing scheme with preprocessing functions $\{E_{I,i}\}_{i \in [n], |I| \ge n-r}$ and decoding functions $\{D_I\}_{|I| \ge n-r}$, it follows that $$CO(I) \ge \frac{kz}{|I|-z}. \quad (4)$$

The decoding bandwidth is defined to be the total amount of Q-ary symbols the user downloads from the nodes, which equals CO(I)+k. Theorem 1 suggests that the communication overhead and the decoding bandwidth decrease as the number of available nodes increases.

For rate-optimal schemes, Theorem 1 implies that if $|I|=n-r$, then the communication overhead is at least z. i.e., the user needs to download the complete share from each available node. The naive decoding function $D_I^*$ in Definition 1 trivially achieves this bound. The more interesting scenario is the regime that $|I|>n-r$. In this case, if (4) is tight, then one can achieve a non-trivial improvement on decoding bandwidth compared to the naive decoder $D_I^*$. When k=1 (i.e., for perfect schemes) and fixing any d>n−r, a rate-optimal scheme can be constructed that achieves the lower bound (4) for any I such that $|I|=d$. However, several interesting and important questions remain open. Firstly, is the lower bound uniformly tight, or in other words, is it possible to construct a scheme that achieves (4) universally for any I such that $|I| \ge n-r$ (note that the scheme in previous works does not achieve the lower bound when $|I| \ne d$)? Secondly, is the bound tight when k>1 (i.e., for ramp schemes) and how to design such schemes? These questions are answered further below. Processes constructed from Shamir's Scheme are described below.

Processes Constructed from Shamir's Scheme

In this section a process in accordance with many embodiments of the invention for rate-optimal scheme that achieves the optimal decoding bandwidth universally for all possible I. i.e., all sets of available nodes is described. This implies that the lower bound in Theorem 1 is uniformly tight. The process creates a scheme based on Shamir's scheme and preserves its simplicity and efficiency. The scheme is flexible in the parameters n, k, r, z and hence is flexible in rate.

Refer back to FIG. 6B for an example of the scheme in accordance with several embodiments of the invention, and use it to describe the general idea of the construction. To construct a scheme that achieves the optimal decoding bandwidth when d nodes are available, for all $d \in \mathcal{D}$, a set of polynomials of different degrees can be designed. Particularly, for all $d \in \mathcal{D}$, a number of polynomials of degree exactly d−1 can be designed, and one evaluation of each polynomial can be stored at each node. For each polynomial, exactly z of its coefficients are independent and uniformly distributed variables, called keys, in order to meet the secrecy requirement. The remaining coefficients encode "information": for the highest-degree (e.g., degree $d_{max}-1$, where $d_{max}=\max_{d\in\mathcal{D}}d$) polynomials, their coefficients encode the entire message; for other polynomials, say $g(x)$, the information encoded in the coefficients of $g(x)$ is the high-degree coefficients of the polynomials of degree higher than $g(x)$. Such an arrangement of the coefficients enables decoding in a successive manner. Consider decoding when d nodes are available, implying that d evaluations of each polynomial are known and hence all polynomials of degree d−1 can be interpolated. Then, roughly speaking, the arrangement ensures that the high-degree coefficients of some higher-degree polynomials are known, so that the remaining unknown parts of these polynomials can be interpolated. This in turn allows to decode coefficients for additional high-degree polynomials and thus to interpolate them. The chain continues until all polynomials of degree higher than d−1 are interpolated, implying that the message is decoded. Note that no polynomials of degree smaller than d−1 are interpolated, and therefore the keys associated with them are not decoded. This leads to the saving in decoding bandwidth and in fact this amount is the best one can expect to save, so that the scheme achieves the optimal bandwidth. A generalized version of Shamir's scheme is discussed below.

Generalized Shamir's Scheme

The following is an (n, n−r−z,r,z) rate-optimal secret sharing scheme: For $q>n$, let $m_1, \ldots, m_{n-z-r}$ be message symbols over $\mathbb{F}_q$. A polynomial $f(x)$ of degree n−r−1 can be constructed over $\mathbb{F}_q$, whose degree 0 to z−1 coefficients are random keys, and the degree z to n−r−1 coefficients are $m_1$ to $m_{n-r-z}$. Evaluate $f(x)$ at n distinct non-zero points and assign one evaluation to each party.

A generalized Shamir's scheme adds more flexibility to processes in accordance with several embodiments of the invention. $f(x)$ can be any degree-(n−r−1) polynomial such that z of its coefficients of consecutive degrees are random keys, and the remaining coefficients are $m_1$ to $m_{n-r-z}$. Then the resulting scheme is still an (n, n−r−z, r, z) rate-optimal secret sharing scheme. Encoding for processes constructed from a generalized Shamir's scheme as described above will be discussed below.

Encoding for Processes Constructed from Shamir's Scheme

Consider arbitrary parameters n, r, z, $\mathcal{D}$ and let k=n−r−z. It can be assumed that n−r∈$\mathcal{D}$ since it is implied by the reliability requirement. Choose any prime power q>n, the scheme is $\mathbb{F}$-linear over share alphabet $Q=\mathbb{F}_q^b$, where b is the number of ($\mathbb{F}_q$) symbols stored by each node. The message m is a vector over $\mathbb{F}_q$ of length |m|=kb. The choice of b is determined by $\mathcal{D}$ in the following way. |m| can be the least common multiple of $\{d-z:d\in\mathcal{D}\}$, i.e., the smallest positive integer that is divisible by all elements of the set. Note that indeed |m| is a multiple of k=n−r−z, and let $$b = \frac{|m|}{k}.$$

This is the smallest choice of |m| (and thus b) that ensures when d∈$\mathcal{D}$ nodes are available, that the optimal bandwidth, measured by the number of $\mathbb{F}_q$ symbols, is an integer.

In accordance with many embodiments of the invention, b polynomials can be constructed over $\mathbb{F}_q$ and each of them evaluated n non-zero points, and every node can store an evaluation of each polynomial. Let $\mathcal{D}=\{d_1, d_2, \ldots, d_{|\mathcal{D}|}\}$, such that $n\geq d_1>d_2>\ldots>d_{|\mathcal{D}|}=n-r$. For $i\in|\mathcal{D}|$, let $$p_i = \begin{cases} \frac{|m|}{d_1-z} & i=1 \\ \frac{|m|}{d_i-z} - \frac{|m|}{d_{i-1}-z} & i>1 \end{cases} \quad (5)$$

In several embodiments of the invention, $p_i$ polynomials can be constructed of degree $d_i-1$. For all polynomials, their z lowest-degree coefficients are independent random keys. The remaining $d_i-z$ non-key coefficients can also be defined. They first can be defined them for the highest degree polynomials, and then recursively defined for the lower degree polynomials. For i=1, the non-key coefficients of the polynomials of degree $d_1-1$ are message symbols. Note that there are |m| message symbols and $$\frac{|m|}{d_1-z}$$

polynomials of degree $d_1-1$. Each such polynomial has $d_1-z$ non-key coefficients and so there are exactly enough coefficients to encode the message symbols. For i>1, the non-key coefficients encode the degree $d_i$ to $d_{i-1}-1$ coefficients of all higher (than $d_i-1$) degree polynomials. Note that there are $$\sum_{j=1}^{i-1} p_j = \frac{|m|}{d_{i-1}-z}$$

higher degree polynomials and so the total number of coefficients to encode is $$(d_{i-1}-d_i)\frac{|m|}{d_{i-1}-z}.$$

On the other hand, there are $p_i$ polynomials of degree $d_i-1$, each of them has $d_i-z$ non-key coefficients, and so the total number of non-key coefficients is $$(d_i-z)\left(\frac{|m|}{d_i-z} - \frac{|m|}{d_{i-1}-z}\right).$$

It is trivial to verify that the two numbers are equal and so there is exactly enough coefficients to encode. Note that the specific way to map the coefficients is not important and any 1-1 mapping suffices. Finally, evaluate each polynomial at n non-zero points and store an evaluation of each polynomial at each node. This completes the scheme. Note that indeed the total number of polynomials is $$\sum_{i=1}^{|\mathcal{D}|} p_i = \frac{|m|}{d_{|\mathcal{D}|}-z} = \frac{|m|}{k} = b,$$

implying that the scheme is rate-optimal.

Decoding for Processes Constructed from Shamir's Scheme

For any $d_i \in \mathcal{D}$, the decoding process of the scheme can be described when $d_i$ nodes are available. It achieves the optimal decoding bandwidth, and since $d_{|\mathcal{D}|}$=n−r it implies that the scheme meets the reliability requirement. All polynomials of degree $d_r$−1 are first interpolated. After that for all polynomials of degree $d_{i-1}$−1, their coefficients of degree larger than $d_i$−1 are known (as they are encoded in the coefficients of the polynomials of degree $d_i$−1) and so they can be interpolated. In general, for j≤i, once the polynomials of degree between $d_j$−1 and $d_i$−1 are interpolated, then for the polynomials of degree $d_{j-1}$−1, their coefficients of degree larger than $d_i$−1 are known by construction and so they can be interpolated. Therefore the polynomials of higher degree can be successively interpolated until the polynomials of degree $d_1$−1 are interpolated and so the message symbols are decoded. The total number of $\mathbb{F}_q$ symbols communicated is $$d_i \sum_{j=1}^{i} p_j = d_i \frac{|m|}{d_i - z}.$$

By Theorem 1, the decoding bandwidth is at least $$|m| + \frac{kbz}{d_i - z} = kb + \frac{kbz}{d_i - z} = kb\left(1 + \frac{z}{d_i - z}\right) = \frac{d_i|m|}{d_i - z}$$

$\mathbb{F}_q$ symbols. Therefore the optimal bandwidth is achieved.
Secrecy for a Process Constructed from Shamir's Scheme It can be shown that a process constructed from Shamir's Scheme is secure against z eavesdropping nodes. Since each polynomial individually is a Shamir's scheme, the secrecy of the scheme derives from the secrecy of Shamir's scheme. The main idea is to show that if these polynomials are combined, the resulting scheme is still secure.
Lemma 1.

Consider random variables $M_1$, $M_2$, $K_1$, $K_2$ such that $K_2$ is independent of $\{M_1, K_1\}$. For i=1, 2 Let $F_i$ be a deterministic function of $M_i$, $K_i$. If $I(M_1; F_1)$=0 and $I(M_2; F_2)$=0, then $I(M_1; F_1, F_2)$=0. In addition, if $K_1$ is independent of $M_2$, then $I(M_1, M_2; F_1, F_2)$=0.

Suppose that the adversary compromises z nodes and obtains z evaluations of each polynomial. Consider the i-th polynomial in the order that they are defined, let $f_i$ denote the adversary's observation of this polynomial, let $k_i$ denote the key coefficients of this polynomial and let $m_i$ denote the non-key coefficients. The secrecy of Shamir's scheme implies that $$I(m_i; f_i)=0, i=1, \ldots, b. \quad (6)$$

Theorem 2.

Let $d_{|\mathcal{D}|} \subset \{n-r, n-r+1, \ldots, n\}$, the process for encoding constructed from Shamir's scheme described above is a rate-optimal (n,k,r,z) secret sharing scheme. The scheme achieves the optimal decoding bandwidth when d nodes participate in decoding, universally for all d∈$d_{|\mathcal{D}|}$.
Discussion for a Process Constructed from Shamir's Scheme The decoding process specified above can decode the secret message correctly if at most r shares are erased or r nodes are not available. It is possible to modify the decoding process in the following way so that the secret message can be decoded correctly if $$\left\lfloor \frac{r}{2} \right\rfloor$$

shares are erroneous or $$\left\lfloor \frac{r}{2} \right\rfloor$$

nodes are malicious. In this case, decoding is equivalent to interpolating polynomials when some of the evaluations are in error. Among the n evaluations of a polynomial, if the number of wrong evaluations is at most $$\left\lfloor \frac{r}{2} \right\rfloor,$$

then the polynomial can be interpolated correctly by the decoder of Reed-Solomon codes.

Other important advantages and properties for a process constructed from Shamir's Scheme in accordance with many embodiments of the invention are discussed below. Firstly, the scheme also achieves the optimal number of symbol-reads from node ks in decoding. To see this, notice that the lower bound (4) on communication overhead is also a lower bound on the number of Q-ary symbols that need to be read from disks during decoding. The number of symbol-reads in the proposed scheme equals to the amount of communication. Therefore our scheme achieves the lower bound and hence is optimal.

Secondly, compared to most existing schemes which decode from the minimum number of n−r−z nodes, our scheme allows all available nodes (or more flexibly, any d∈$\mathcal{D}$ nodes) to participate in decoding and hence can help balance the load at the disks and achieves a higher degree of parallelization. Thirdly, the encoding and decoding of the process in accordance with various embodiments of the invention are similar to that of Shamir's scheme and therefore are efficient and practical. Particularly, the process works over the same field as Shamir's scheme. Fourthly, the preprocessing functions only rely on d=|I| instead of I, further simplifying implementation. Finally, the construction is flexible in the parameters, i.e., it works for arbitrary values of n, r and z and $\mathcal{D}$.

An important idea in our scheme is to construct polynomials of different degrees in order to facilitate decoding when different number of nodes are available. The main technique that enables the improvement of processes in accordance with various embodiments of the invention is a more careful and flexible design of the numbers and degrees of the polynomials, as well as the arrangement of their coefficients.

An embodiment in accordance with several embodiments of the present invention maps the high-degree coefficients of the higher degree polynomials into the coefficients of the lower degree polynomials, whereas the specific mapping is not important and any 1-1 mapping suffices. In practice, the flexibility in choosing the specific mapping is helpful. Particularly, it is possible to improve the (computational) encoding complexity of the scheme substantially by choosing a mapping that maintains the order of the coefficients. Refer to FIG. 6B as described above for an example. $m_4 x + m_5 x^2 + m_6 x^3$ needs to be computed in evaluating g(x), and this computation can be reused in evaluating f(x), because f(x) contains the same run of consecutive coefficients $m_4 x^4 + m_5 x^5 + m_6 x^6$. In this example, this reuse of computations will save two multiplications and two additions. Other numbers of calculations can be saved with other examples in accordance with other embodiments of the invention.

Flexibility

In various embodiments of the present invention, for all polynomials in the process, the z lowest degree coefficients are independent keys. However, in general this is not necessary: in any polynomial, any consecutive z coefficients can be chosen to be independent keys, the remaining coefficients can be used to encode information (i.e., message symbols and coefficients of higher degree polynomials). The resulting process is still valid and achieves the optimal decoding bandwidth universally.

As noted above, the flexibility many embodiments of the present invention in choosing the coefficient mapping is beneficial in practice. Furthermore, choosing the lowest degree coefficients to be keys has several practical advantages: decoding the scheme involves sequentially interpolating the polynomials through multiple iterations, which can lead to undesirable delay especially when $|\mathcal{D}|$ is large. To mitigate this issue, the message symbols can be decoded "on the fly" in each iteration. Specifically, if d nodes are available, then each time a polynomial is interpolated, exactly d new message and/or key symbols are decoded. Since the number of symbols decoded in each interpolation, the total number of message symbols and the total number of key symbols to be decoded are all fixed, there is a trade-off between the decoding order of the key and message symbols. The optimal trade-of is to delay decoding the keys as much as possible, so that the maximum number of message symbols are decoded on the fly. Specifically, notice that by the time that a number of i polynomials are interpolated, at least zi key symbols are decoded since each polynomial introduces z independent key coefficients for secrecy. The optimal trade-off is achieved if indeed exactly zi keys are decoded, implying that (d−z)i message symbols are decoded. The process can achieve this optimal trade-off by choosing the z lowest degree coefficients to be keys. This is because by construction, only coefficients of degree higher than $d_{|\mathcal{D}|}=$n−r>z will be mapped to the coefficients of the lower degree polynomials. Hence the key coefficients are never mapped, implying that the remaining information coefficients encode only message symbols. Therefore, at any moment during the decoding process, many embodiments of the present invention decode the maximum number of message symbols. In other words the decoding delay, measured in the number of iterations, averaged over all message symbols, is minimized. Moreover, the fact that each polynomial interpolation decodes a fixed number of d−z new message symbols is helpful for implementation. On the other hand, note that choosing the z highest degree coefficients to be keys implies that the keys will be mapped to the coefficients of lower degree polynomials. Hence the keys will be decoded earlier than necessary (since lower degree polynomials are interpolated earlier) and it is not possible to achieve the optimal trade-off. Consider the example in FIG. 6B, if the keys are switched to high degree coefficients, then the polynomials are $f(x)=m_1+m_2x+m_3x^2+m_4x^3+m_5x^4+m_6x^5+k_1x^6$, $g(x)=m_5+m_6x+k_1x^2+k_2x^3$ and $h(x)=m_4+k_2x+k_3x^2$. In the case that d=4 nodes are available, only 2 message symbols $m_5,m_6$ are decoded in the first iteration and the remaining 4 message symbols are decoded in the second (last) iteration. In comparison, the original scheme performs better by decoding 3 message symbols in each iteration. Finally, decoding the maximum number of message symbols on the fly is also beneficial in terms of partial decoding, i.e., decoding a subset of message symbols. In this case decoding can finish early if all symbols of interest are decoded, and various embodiments of the present invention will maximize the chance of finishing early. Processes constructed from Reed-Solomon codes in accordance with many embodiments of the invention will be discussed below.

Processes Constructed from Reed-Solomon Codes

In this section another rate-optimal secret sharing scheme that achieves the optimal decoding bandwidth when all n nodes are available in accordance with several embodiments of the invention is presented. The scheme is flexible in the parameters and hence is flexible in rate. Several embodiments of the present invention are directly related to Reed-Solomon codes. Particularly, the encoding matrix of the scheme is a generator matrix of Reed-Solomon codes, and so the scheme can be decoded as Reed-Solomon codes. This is an advantage over the process described above, which requires recursive decoding. The scheme also provides a stronger level of reliability in the sense that it allows decoding even if more than r shares are partially erased. On the other hand, unlike the previous process in accordance with various embodiments of the invention, this process does not achieve the optimal decoding bandwidth universally, but rather only for d=n−r and d=n. However, the case that the n nodes are available is particularly important because it correspond to the best case in terms of decoding bandwidth and is arguably the most relevant case for the application of distributed storage, where the storage nodes are usually highly available. Encoding for processes in accordance with many embodiments of the invention constructed from Reed-Solomon codes will be described below.

Encoding for Processes Constructed from Reed-Solomon Codes

In many embodiments of the present invention, fix k=n−r−z, let q>n(k+r) be a prime power, and let the share alphabet be $Q=\mathbb{F}_q^{k+r}$. Note that each share is a length k+r vector over $\mathbb{F}_q$. For j=1, . . . , n, denote the j-th share by $c_j=(c_{1,j}, \ldots, c_{k+r,j})$, where $c_{i,j}\in\mathbb{F}_q$. The secret message m is k symbols over Q and therefore can be regarded as a length-k(k+r) vector over $\mathbb{F}_q$, denoted by $(m_1, \ldots, m_{k(k+r)})$. The encoder generates keys $k=(k_1, \ldots, k_{kz})\in\mathbb{F}_q^{kz}$ and $k'=(k'_1, \ldots, k'_{rz})\in\mathbb{F}_q^{rz}$ independently and uniformly at random. The encoding scheme is linear over $\mathbb{F}_q$, and is described by an encoding matrix G over $\mathbb{F}_q$:

$$(c_{1,1}, \ldots, c_{1,n}, \ldots, c_{k+r,1}, \ldots, c_{k+r,n}) = (m_1, \ldots, m_{k(k+r)}, k_1, \ldots, k_{kz}, k'_1, \ldots, k'_{rz})G. \quad (7)$$

Note that G has k(k+r)+kz+rz=nk+rz rows and has n(k+r) columns. In the following the construction of G based on a Vandermonde matrix will be discussed. First some notation is introduced. Let $\alpha_1, \ldots, \alpha_{n(k+r)}$ be distinct non-zero elements of $\mathbb{F}_q$, and let $v_{ij}=\alpha_j^{i-1}$, i=1, . . . , nk+rz, j=1, . . . , n(k+r), then $V=(v_{ij})$ is a Vandermonde matrix of the same size as G. Suppose $f=(f_0, \ldots, f_i)$ is an arbitrary vector with entries in $\mathbb{F}_q$, by f[x] the polynomial $f_0+f_1x+\ldots+f_ix^i$ over $\mathbb{F}_q$ can be denoted with indeterminate x. A set of polynomials can be constructed as follows:

$$f_i[x] = x^{i-1} \quad i = 1, \ldots, kn, \quad (8)$$

$$f_{kn+1}[x] = x^{i-1}\prod_{j=1}^{kn}(x-\alpha_j) \quad (9)$$

Let $f_i$, i=1, . . . , kn+rz be the length-(kn+rz) vectors over $\mathbb{F}_q$ corresponding to the polynomials. Stack the $f_i$'s to obtain a square matrix of size (kn+rz):

$$T = \begin{pmatrix} f_1 \\ \vdots \\ f_{kn+rz} \end{pmatrix}$$

Finally, the construction can be complete by setting $$G = TV.$$

Example 1

Consider the setting that $n=3, r=1, z=1$ and $k=n-r-z=1$. Let $q=7$ and $Q=\mathbb{F}_q^2$. Then $m=(m_1, m_2)$, $k=(k_1)$ and $k'=(k'_1)$. Construct a Vandermonde matrix over $F_q$ as $$V = \begin{pmatrix} 1 & 1 & 1 & 1 & 1 & 1 \\ 1 & 2 & 3 & 4 & 5 & 6 \\ 1 & 4 & 2 & 2 & 4 & 1 \\ 1 & 1 & 6 & 1 & 6 & 6 \end{pmatrix}. \quad (10)$$

Construct Polynomials $$f_1[x]=1, f_2[x]=x, f_3[x]=x^2 \text{ and}$$

$$f_4[x]=(x-1)(x-2)(x-3)=1+4x+x^2+x^3.$$

Therefore, $$T = \begin{pmatrix} f_1 \\ f_2 \\ f_3 \\ f_4 \end{pmatrix} = \begin{pmatrix} 1 & 0 & 0 & 0 \\ 0 & 1 & 0 & 0 \\ 0 & 0 & 1 & 0 \\ 1 & 4 & 1 & 1 \end{pmatrix},$$

and the encoding matrix is given by $$G = TV = \begin{pmatrix} 1 & 1 & 1 & 1 & 1 & 1 \\ 1 & 2 & 3 & 4 & 5 & 6 \\ 1 & 4 & 2 & 2 & 4 & 1 \\ 0 & 0 & 0 & 6 & 3 & 4 \end{pmatrix}.$$

The properties of G are discussed in the following lemma.

Lemma 2.

Regard G as a block matrix $$G = \begin{pmatrix} G_{11} & G_{12} \\ G_{21} & G_{22} \end{pmatrix},$$

where $G_{11}$ has size $kn \times kn$, $G_{12}$ has size $kn \times rn$, $G_{21}$ has size $rz \times kn$, and $G_{22}$ has size $rz \times rn$. Then, (i) Any $(n-r)(k+r)$ columns of G are linearly independent.
(ii) $G_{11}$ is a Vandernmonde matrir.
(iii) $G_{21}=0$.
(iv) Any $rz$ columns of $G_{22}$ are linearly independent.

Decoding for processes constructed from Reed-Solomon codes will be described below.

Decoding for Processes Constructed from Reed-Solomon Codes

The decoding procedure for processes constructed from Reed-Solomon codes in accordance with several embodiments of the invention are described for two cases: 1) $|I|=n$, i.e., all nodes are available, and 2) $|I|<n$. First consider the case that $|I|=n$, i.e., $I=[n]$. In order to decode, for this case it suffices to read and communicate the first k symbols over $\mathbb{F}_q$ from each share. Formally, the user downloads $e=(c_{1,1}, \ldots, c_{1,n}, \ldots, c_{k,1}, \ldots, c_{k,n})$. By Lemma 2.(ii), $G_{11}$ is invertible. Denote the inverse of $G_{11}$ by $G_{11}^{-1}$, then the secret can be recovered by $$eG_{11}^{-1} \stackrel{(e)}{=} (m_1, \ldots, m_{k(k+r)}, k_1, \ldots, k_{kz}),$$

where (e) follows from (7) and Lemma 2.(iii). The decoding process involves communicating $kn$ symbols from $\mathbb{F}_q$. The communication overhead is $kz$ symbols over $\mathbb{F}_q$ or $$\frac{kz}{k+r} = \frac{kz}{n-z}$$

Q-ary symbols, which achieves the lower bound (4) and therefore is optimal.

Next consider the case that $n-r \leq |I| < n$. Select an arbitrary subset $I'$ of $I$ of size $n-r$, and download the complete share stored by the nodes in $I'$. Hence, the downloaded information $e$ is a length-$(n-r)(k+r)$ vector over $\mathbb{F}_q$. By Lemma 2.(i), it follows that any $(n-r)(k+r)$ columns in G are linearly independent and therefore the submatrix formed by these columns is invertible. The secret m can then be recovered by multiplying $e$ with the inverse. An alternative way to decode the secret is to notice that G is an encoding matrix of a $(nk+nr, nk+rz)$ Reed-Solomon code over $\mathbb{F}_q$. Therefore one may employ the standard decoder of Reed-Solomon code to correct any $r(k+r)$ erasures or $\lfloor r(k+r)/2 \rfloor$ errors of symbols over $\mathbb{F}_q$. Note that when at most r nodes are unavailable, their shares can be regarded as erased and there are at most $r(k+r)$ erasures of symbols over $\mathbb{F}_q$, and therefore can be corrected. In general, any $r(k+r)$ erasures or $\lfloor r(k+r)/2 \rfloor$ errors are correctable even if they occur to more than r nodes. The decoding process involves communicating $nk+rz$ symbols of $\mathbb{F}_q$. The communication overhead is $(n-r)(k+r)-k(k+r)=z(k+r)$ symbols over $\mathbb{F}_q$, or z symbols over Q, which achieves the lower bound (4) if and only if $|I|=n-r$.

Theorem 3.

The encoding scheme constructed above from Reed-Solomon codes is a rate-optimal $(n,k,r,z)$ secret sharing scheme. The scheme achieves the optimal decoding bandwidth when d nodes participate in decoding, for $d=n$ or $d=n-r$.

Theorem 3 shows that the proposed secret sharing scheme is optimal in terms of storage usage and is optimal in terms of best-case (i.e., $|I|=n$) communication overhead. Compared to processes in accordance with several embodiments of the invention constructed from Shamir's scheme as described above, processes constructed from Reed-Solomon codes have advantages in terms of implementation and error correction because decoding the scheme is equivalent to decoding standard Reed-Solomon codes. The scheme also provides a stronger level of reliability in the sense that it allows decoding even if more than r shares are partially erased. Similar to previous discussion on flexibility for processes constructed from Shamir's scheme, processes constructed from Reed-Solomon codes can achieve the optimal number of symbol-reads from disks when $|I|=n$. Finally, in processes constructed from Reed-Solomon codes all operations are performed over the field $\mathbb{F}_q$, where $q>n(k+r)$. In several embodiments of the present invention, this requirement on the field size can be relaxed in the following simple way. Let $\beta$ be the greatest common divisor of k and r, then instead of choosing Q to be $\mathbb{F}_q^{k+r}$, let $$Q = \mathbb{F}_q^{\frac{k}{\beta}+\frac{r}{\beta}}, m = (m_1, \ldots, m_{\frac{k(k+r)}{\beta}}).$$

-continued $$k = (k_1, \ldots, k_{\frac{kz}{\beta}}) \text{ and } k' = (k'_1, \ldots, k'_{\frac{rz}{\beta}}).$$

The resulting scheme is a rate-optimal $(n,k,r,z)_Q$ secret sharing scheme with the same communication overhead function as the original scheme. For this modified construction, it is sufficient to choose any field size $$q > n\frac{k+r}{\beta}.$$

Processes in accordance with many embodiments of the invention constructed from random codes will be discussed below.

Processes Constructed from Random Codes

In this section, processes in accordance with various embodiments of the invention constructed from a rate-optimal (perfect or ramp) secret sharing scheme based on random linear codes that achieves the optimal decoding bandwidth universally will be described. The scheme meets the secrecy requirement deterministically, and meets the reliability requirement with high probability as the field size grows. Encoding processes constructed from random codes will be discussed below.

Encoding Processes Constructed from Random Codes

In various embodiments of the invention processes constructed from random codes can be encoded. Let $k=n-r-z$, $q$ be a prime power, and let N be the least common multiple of $\{n-z-r, n-z-r+1, \ldots, n-z\}$. Set $Q=\mathbb{F}_q^{N(k+r)}$. Therefore each share of the secret is a length $N(k+r)$ vector over $\mathbb{F}_q$. For $j=1, \ldots, n$, denote the j-th share by $c_j=(c_{1,j}, \ldots, c_{N(k+r),j})$, where $c_{i,j} \in \mathbb{F}_q$. The secret m consists of k symbols over Q and is regarded as a length-$Nk(k+r)$ vector over $\mathbb{F}_q$, denoted by $(m_1, \ldots, m_{Nk(k+r)})$. The encoder generates uniformly distributed random vectors $k=(k_1, \ldots, k_{Nkz}) \in \mathbb{F}_q^{Nkz}$ and $k'=(k'_1, \ldots, k'_{Nrz}) \in \mathbb{F}_q^{Nrz}$, independently from m. The encoding scheme is described by a set of $N(kn+rz) \times n$ encoding matrices $G_i$, $i=1, \ldots, N(k+r)$ over $\mathbb{F}_q$, such that $$(c_{i,1}, \ldots, c_{i,n}) = (mkk')G_i, i=1, \ldots, N(k+r). \quad (11)$$

Intuitively, if the $c_{u,v}$'s are arranged into a matrix, then $G_i$ is the encoding matrix for the i-th row. Next, the construction of the $G_i$ matrices will be described. For $i=1, \ldots, Nk$, let the first $Nk(k+r)$ rows of $G_i$ be a random matrix, let the next $Nkz$ rows of $G_i$ be a Vandermonde matrix, and let the remaining $Nrz$ rows of $G_i$ be zero. Formally, for $i=1, \ldots, Nk$, $$G_i = \begin{pmatrix} R_i \\ V_i \\ 0 \end{pmatrix}, \quad (12)$$

where $R_i \in \mathbb{F}_q^{Nk(k+r) \times n}$ is a random matrix with entries i.i.d. uniformly distributed over $\mathbb{F}_q$, and $V_i \in \mathbb{F}_q^{Nkz \times n}$ is a Vandermonde matrix, i.e., the (u,v)-th entry of $V_i$ equals $\alpha_{v,i}^{u-1}$. Here $\alpha_{v,i}$ are distinct non-zero elements of $\mathbb{F}_q$, for $i=1, \ldots, N(k+r)$, and $v=1, \ldots, n$.

Figure 7:
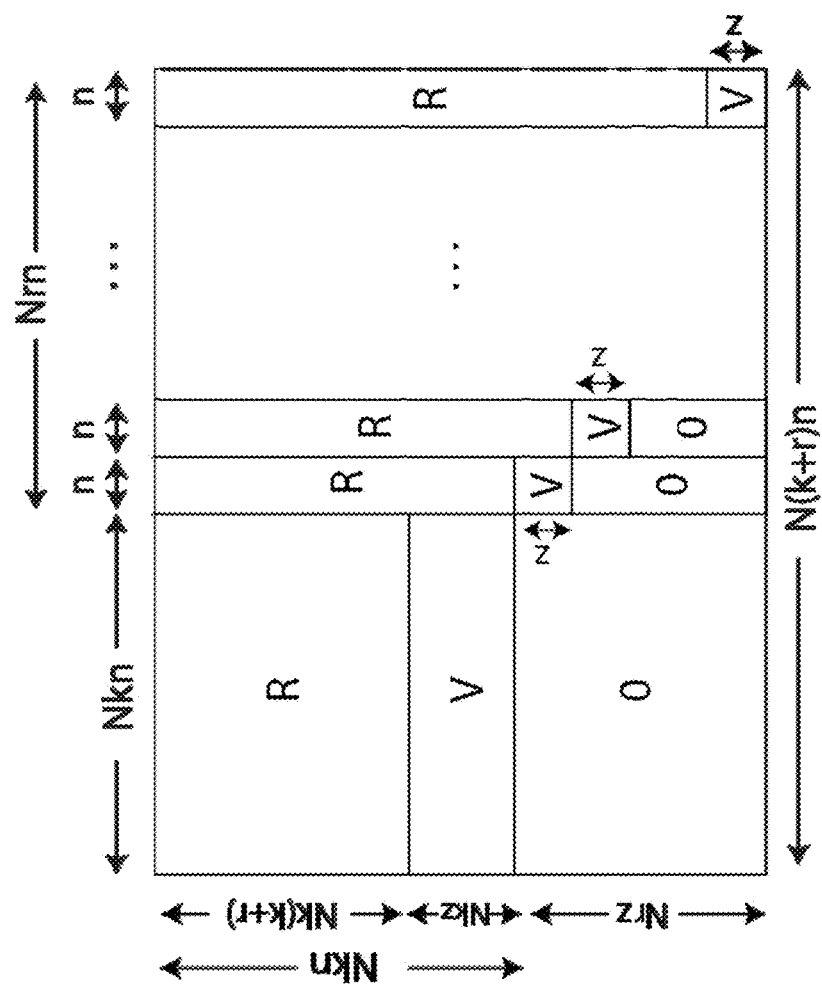
FIG. 7 is a diagram illustrating a blockwise structure utilized in encoding secret sharing schemes from random codes in accordance with an embodiment of the invention.

For $i=1, \ldots, Nr$, let the first $Nkn+(i-1)z$ rows of $G_{Nk+i}$ be a random matrix, let the next z rows of $G_{Nk+i}$ be a Vandermonde matrix, and let the remaining $(Nr-i)z$ rows of $G_{Nk+i}$ be zero. Formally, for $i=1, \ldots, Nr$, $$G_{Nk+i} = \begin{pmatrix} R_{Nk+i} \\ V_{Nk+i} \\ 0 \end{pmatrix}, \quad (13)$$

where $R_{Nk+i} \in \mathbb{F}_q^{(Nkn+(i-1)z) \times n}$ is a random matrix with entries i.i.d. uniformly distributed over $\mathbb{F}_q$, and $V_{Nk+i} \in \mathbb{F}_q^{z \times n}$ is a Vandermonde matrix, i.e., the (u,v)-th entry of $V_{Nk+i}$ equals $\alpha_{v,Nk+i}^{u-1}$. This completes the encoding scheme. The structure of the whole encoding matrix $(G_1, \ldots, G_{N(k+r)})$ is illustrated in FIG. 7 which illustrates a blockwise structure of the matrix $(G_1, \ldots, G_{N(k+r)})$. Blocks of random matrices are labeled by R, blocks of Vandermonde matrices are labeled by V, and blocks of zero matrices are labeled by 0.

The following result shows that processes in accordance with several embodiments of the invention constructed from random codes meet the security requirement deterministically, due to the Vandermonde matrices embedded in the $G_i$'s.

Theorem 4.

The encoding scheme constructed in this section is secure, i.e., $H(m|c_I)=H(m)$, for all I such that $|I|=z$.

Decoding processes constructed from random codes will be discussed below.

Decoding Processes Constructed from Random Codes

The decoding scheme for processes in accordance with many embodiments of the invention constructed from random codes is discussed next. In several embodiments of the invention, the decoding scheme can be implemented for any I such that $|I| \geq n-r$. Let $$d \triangleq \frac{Nk(n-|I|)}{|I|-z}, \quad (14)$$

then note that d is an integer because $|I|-z$ divides N and that d is the solution to the equation $(Nk+d)|I|=Nkn+dz$.

In order to decode, it suffices to read and communicate the first $Nk+d$ symbols over $\mathbb{F}_q$ from each available share. Intuitively, by reading the first $Nk+d$ symbols from each available share, a system of $(Nk+d)|I|$ equations can exist. On the other hand, the variables involved in these equations are $m_1, \ldots, m_{Nk(k+r)}, k_1, \ldots, k_{Nkz}$ and $k'_1, \ldots, k'_{dz}$, i.e., the total number of variables is $Nkn+dz$. Because d is the solution to $(Nk+d)|I|=Nkn+dz$, the number of equations in the system equals the number of variables, and is uniquely solvable if the equations are linearly independent.

More formally, let $S_i=\mathbb{F}_q^{Nk+d}$, and let $E_i(c_i)=(c_{1,i}, \ldots, c_{Nk+d,i})$. Denote for short that $c_i=(c_{i,j})_{j \in I}$, and denote the submatrix formed by the set of columns in I of $G_i$ by $G_{i,I}$. Then it follows from (11) that, $$e_I = (c_1, \ldots, c_{Nk+d}) = (mkk')(G_{1,I}, \ldots, G_{Nk+d,I}).$$

By construction (12) and (13), the last $(Nr-d)z$ rows of the matrices $G_{1,I}, \ldots, G_{Nk+d,I}$ are all zeros. Therefore the last $(Nr-d)z$ rows from $G_{1,I}, \ldots, G_{Nk+d,I}$ may be deleted and denoted by $(G_{1,I}^*, \ldots, G_{Nk+d,I}^*)$ the corresponding trimmed matrix. It then follows that.

$$e_I = (c_1, \ldots, c_{Nk+d}) = (mkk'_1, \ldots, k'_{dz})(G_{1,I}^*, \ldots, G_{Nk+d,I}^*).$$

It is now evident that if the matrix $(G_{1,I}^*, \ldots, G_{Nk+d,I}^*)$ has full row rank, then it is right invertible and the secret can be recovered. The following result shows that the matrix indeed has full row rank with high probability.

Theorem 5.

For any I such that $|I| \geq n-r$, $(G_{1,I}^*, \ldots, G_{Nk+d,I}^*)$ has full row rank with probability at least $$1 - \frac{1}{q-1},$$

over the distribution of the random matrices $R_1, \ldots, R_{Nk+d}$.

The following result summarizes the properties of scheme.

Corollary 1.

The encoding scheme constructed for processes constructed from random codes described above is a rate-optimal (n,k,r,z) secret sharing scheme with high probability. Specifically, the scheme meets the security requirement deterministically, and meets the reliability requirement with probability at least $$1 - \frac{2^n}{q-1},$$

over the distribution of the random matrices $R_1, \ldots, R_{Nk+d}$. The scheme achieves the optimal decoding bandwidth when d nodes participate in decoding, universally for all $n-r \leq d \leq n$.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A secure method for distributed storage of data, comprising:
    encoding source data using an encoding system and a set of polynomials to produce a plurality of sets of encoded data, where:
        each polynomial in the set of polynomials has a plurality of coefficients that are randomly generated keys and remaining coefficients are derived from the source data, wherein the plurality of coefficients are of consecutive degrees in the polynomials;
        the source data can be recovered from at least a portion of less than all of the plurality of sets of encoded data; and
        the source data cannot be recovered using less than a threshold number of the plurality of sets of encoded data;
    storing each of the plurality of sets of encoded data on a storage device from a set of storage devices on which encoded data is stored;
    determining a set of storage devices that are available using a decoding system, where the set of storage devices that are available does not include all of the storage devices in the set of storage devices on which encoded data is stored;
    retrieving at least a portion of each of the plurality of sets of encoded data stored on a number of storage devices determined based upon the set of storage devices that are available using the decoding system; and
    recovering the source data from encoded data retrieved from each of the set of storage devices that are available using the decoding system.

2. The method of claim 1, wherein retrieving at least a portion of each of the plurality of sets of encoded data stored on a number of storage devices determined based upon the set of storage devices that are available using the decoding system further comprises:
    selecting a number of storage devices from which to retrieve at least a portion of one of the plurality of sets of encoded data from a set of at least three different numbers of storage devices;
    wherein decoding bandwidth used to retrieve sufficient encoded data from the set of storage devices that are available to reconstruct the source data decreases with increase in the selected number of storage devices.

3. The method of claim 1, wherein total size of the plurality of sets of encoded data divided by the number of storage devices in the set of storage devices on which the encoded data is stored is less than the size of the source data.

4. The method of claim 1, wherein the source data is larger than at least one of the sets of encoded data in the plurality of sets of encoded data.

5. The method of claim 4, wherein the source data is larger than the average size of the sets of encoded data in the plurality of sets of encoded data.

6. The method of claim 5, wherein the source data is larger than all of the sets of encoded data in the plurality of sets of encoded data.

7. The method of claim 1, wherein decoding bandwidth used to retrieve sufficient encoded data from the set of storage devices that are available to reconstruct the source data depends upon the number of storage devices in the set of storage devices that are available and decreases with each additional storage device that is available.

8. The method of claim 7, wherein retrieving at least a portion of each of the plurality of sets of encoded data stored on each of the set of storage devices that are available utilizes a minimum decoding bandwidth necessary to retrieve sufficient encoded data from the set of storage devices that are available to reconstruct the source data.

9. The method of claim 1, wherein:
    when the number of storage devices in the set of storage devices that are available equals the threshold number, retrieving at least a portion of each of the plurality of sets of encoded data stored on each of the set of storage devices that are available comprises retrieving the entirety of each of the plurality of sets of encoded data stored on each of the set of storage devices that are available; and
    when the number of storage devices in the set of storage devices that are available exceeds the threshold number, retrieving at least a portion of each of the plurality of sets of encoded data stored on each of the set of storage devices that are available comprises retrieving less than the entirety of the set of encoded data stored on at least one of the set of storage devices that are available.

10. The method of claim 1, wherein encoding source data using an encoding system comprises encoding source data using a set of polynomials comprises encoding the source data using a Vandermonde matrix.

11. The method of claim 1, where:
    the set of polynomials includes a plurality of polynomials of different degrees; and one evaluation of each polynomial in the set of polynomials is stored on each of the storage devices in the set of storage devices.

12. The method of 1, wherein recovering the source data from encoded data retrieved from each of the set of storage devices that are available comprises:
interpolating polynomials from the set of polynomials having degree that is one less than the number of physical storage devices in the set of storage devices that are available;
successively interpolating additional polynomials from the set of polynomials until the source data is recovered by recovering the coefficients of the highest degree polynomial.

13. The method of claim 1, wherein:
encoding source data comprises multiplying the source data and a plurality of randomly generated keys by an encoding matrix; and
the encoding matrix is an encoding matrix of a Reed-Solomon code based upon the set of polynomials.

14. The method of claim 1, wherein:
the set of polynomials forms a set of encoding matrices; and
encoding source data to generate a set of encoded data comprises multiplying the source data and a plurality of randomly generated keys by an encoding matrix from the set of encoding matrices.

15. The method of claim 1, wherein the storage devices in the set of storage devices on which encoded data is stored are separate physical storage devices.

16. The method of claim 1, wherein the storage devices in the set of storage devices on which encoded data is stored are virtual storage devices defined with respect to at least one physical storage device.

17. A secure method for distributed storage of data, comprising:
encoding source data using an encoding system and a set of polynomials to produce a plurality of sets of encoded data, where:
each polynomial in the set of polynomials has a plurality of coefficients that are randomly generated keys and remaining coefficients are derived from the source data, wherein the plurality of coefficients are of consecutive degrees in the polynomials;
the source data can be recovered from at least a portion of less than all of the plurality of sets of encoded data;
polynomials in the set of polynomials having a degree that is lower than a highest degree polynomial in the set of polynomials include remaining coefficients that are derived from the coefficients of the highest degree polynomial;
the source data cannot be recovered using less than a threshold number of the plurality of sets of encoded data; and
encoding source data comprises multiplying the source data and a plurality of randomly generated keys by an encoding matrix,
storing each of the plurality of sets of encoded data on a storage device from a set of storage devices on which encoded data is stored;
determining a set of storage devices that are available using a decoding system, where the set of storage devices that are available does not include all of the storage devices in the set of storage devices on which encoded data is stored;
retrieving at least a portion of each of the plurality of sets of encoded data stored on a number of storage devices determined based upon the set of storage devices that are available using the decoding system; and
recovering the source data from encoded data retrieved from each of the set of storage devices that are available using the decoding system.

18. The method of claim 17, wherein the remaining coefficients that are derived from the coefficients of the highest degree polynomial are mapped from the coefficients of the highest degree polynomial in the same order as the coefficients of the highest degree polynomial.

19. The method of claim 17, wherein the remaining coefficients derived from the source data are each portions of the source data.

20. The method of claim 17, wherein the at least one coefficient that is a randomly generated key in each polynomial in the set of polynomials are the lowest degree coefficients in the polynomials.

21. The method of claim 20, wherein polynomials in the set of polynomials having a degree that is lower than a highest degree polynomial in the set of polynomials include remaining coefficients that are derived from the coefficients of the highest degree polynomial.

22. The method of claim 21, wherein the remaining coefficients that are derived from the coefficients of the highest degree polynomial are mapped from the coefficients of the highest degree polynomial in the same order as the coefficients of the highest degree polynomial.

23. A secure method for distributed storage of data, comprising:
encoding source data using an encoding system and a set of polynomials to produce a plurality of sets of encoded data, where:
the source data can be recovered from at least a portion of less than all of the plurality of sets of encoded data;
the source data cannot be recovered using less than a threshold number of the plurality of sets of encoded data; and
encoding source data comprises multiplying the source data and a plurality of randomly generated keys by an encoding matrix, wherein the encoding matrix is an encoding matrix of a Reed-Solomon code based upon the set of polynomials and wherein the encoding matrix contains at least $rz \times kn$ entries with a value of 0, where n is the number of storage devices in the set of storage devices on which encoded data is stored, r is a number of storage device on which encoded data is stored that that can be unavailable and the source data can still be recovered, $z+1$ is the threshold;
storing each of the plurality of sets of encoded data on a storage device from a set of storage devices on which encoded data is stored;
determining a set of storage devices that are available using a decoding system, where the set of storage devices that are available does not include all of the storage devices in the set of storage devices on which encoded data is stored;
retrieving at least a portion of each of the plurality of sets of encoded data stored on a number of storage devices determined based upon the set of storage devices that are available using the decoding system; and
recovering the source data from encoded data retrieved from each of the set of storage devices that are available using the decoding system.

24. The method of claim 13, wherein recovering the source data from encoded data retrieved from each of the set of storage devices that are available comprises multiplying the encoded data retrieved from each of the set of storage devices that are available by the inverse of at least a submatrix of the encoding matrix.

25. The method of claim 24, wherein the decoder is a standard Reed-Solomon decoder.

26. A method of retrieving source data securely stored on a set of physical storage devices as a plurality of sets of encoded data, comprising:
   determining a set of storage devices that are available from a set of storage devices on which encoded data is stored using a decoder, where the set of storage devices that are available does not include all of the storage devices in the set of storage devices on which encoded data is stored and the encoded data is encoded using a set of polynomials;
   retrieving at least a portion of each of a plurality of sets of encoded data using a decoder, where each of the plurality of sets of encoded data is stored on one of the set of storage devices that are available; and
   recovering the source data from encoded data retrieved from each of the set of storage devices that are available using a decoder by:
      interpolating polynomials from the set of polynomials having degree that is no more than one less than the number of physical storage devices in the set of storage devices that are available; and
      successively interpolating additional polynomials from the set of polynomials until the source data is recovered by recovering the coefficients of the highest degree polynomial
   where:
      the source data can be recovered from at least a portion of less than all of the plurality of sets of encoded data; and
      the source data cannot be recovered using less than a threshold number of the plurality of sets of encoded data.

27. The method of claim 26, wherein retrieving at least a portion of each of the plurality of sets of encoded data utilizes a minimum decoding bandwidth necessary to retrieve sufficient encoded data from the set of storage devices that are available to reconstruct the source data.

* * * * *